United States Patent
de Plater et al.

(10) Patent No.: US 10,926,179 B2
(45) Date of Patent: Feb. 23, 2021

(54) NEMESIS CHARACTERS, NEMESIS FORTS, SOCIAL VENDETTAS AND FOLLOWERS IN COMPUTER GAMES

(71) Applicant: Warner Bros. Entertainment, Inc., Burbank, CA (US)

(72) Inventors: Michael de Plater, Seattle, WA (US); Christopher Herman Hoge, Kirkland, WA (US); Robert Kenyon Hull Roberts, Redmond, WA (US); Daniel Paul Valerius, Duvall, WA (US); Rocky Albert Newton, Seattle, WA (US); Kevin Leslie Stephens, Redmond, WA (US)

(73) Assignee: WARNER BROS. ENTERTAINMENT INC., Burbank, CA (US)

( * ) Notice: Subject to any disclaimer, the term of this patent is extended or adjusted under 35 U.S.C. 154(b) by 139 days.

(21) Appl. No.: 15/081,732

(22) Filed: Mar. 25, 2016

(65) Prior Publication Data

US 2016/0279522 A1    Sep. 29, 2016

Related U.S. Application Data

(60) Provisional application No. 62/303,738, filed on Mar. 4, 2016, provisional application No. 62/138,920, filed on Mar. 26, 2015.

(51) Int. Cl.
*A63F 13/67* (2014.01)
*A63F 13/58* (2014.01)
(Continued)

(52) U.S. Cl.
CPC .............. *A63F 13/67* (2014.09); *A63F 13/58* (2014.09); *A63F 13/69* (2014.09); *A63F 13/798* (2014.09)

(58) Field of Classification Search
None
See application file for complete search history.

(56) References Cited

U.S. PATENT DOCUMENTS

2004/0143852 A1* 7/2004 Meyers .................. A63F 13/12
725/133
2004/0259613 A1* 12/2004 Machida ................ A63F 13/10
463/1

(Continued)

OTHER PUBLICATIONS

"Shadow of Mordor sounds like Arkham Batman games", Robert Purchese, Dec. 16, 2013, Eurogamer, https://www.eurogamer.net/articles/2013-11-13-shadow-of-mordor-sounds-like-arkham-batman-games (Year: 2013).*

(Continued)

*Primary Examiner* — Damon J Pierce
(74) *Attorney, Agent, or Firm* — One LLP; Jonathan Jaech

(57) ABSTRACT

Methods for managing non-player characters and power centers in a computer game are based on character hierarchies and individualized correspondences between each character's traits or rank and events that involve other non-player characters or objects. Players may share power centers, character hierarchies, non-player characters, and related quests involving the shared objects with other players playing separate and unrelated game instances over a computer network, with the outcome of the quests reflected in different the games. Various configurations of game machines are used to implement the methods.

36 Claims, 17 Drawing Sheets

(51) Int. Cl.
*A63F 13/69* (2014.01)
*A63F 13/798* (2014.01)

(56) References Cited

U.S. PATENT DOCUMENTS

| | | | |
|---|---|---|---|
| 2007/0087835 A1* | 4/2007 | Van Luchene | A63F 13/12 463/43 |
| 2007/0129148 A1* | 6/2007 | Van Luchene | G06Q 30/04 463/42 |
| 2008/0139318 A1* | 6/2008 | Van Luchene | A63F 13/12 463/42 |
| 2013/0072308 A1* | 3/2013 | Peck | A63F 13/65 463/42 |
| 2014/0213356 A1* | 7/2014 | Iwano | A63F 13/10 463/31 |
| 2015/0238862 A1* | 8/2015 | Suzuki | A63F 13/58 463/31 |

OTHER PUBLICATIONS

Crusader Kings game manual, Paradox Entertainment, 2004 (Year: 2004).*
Crusader Kings II—FAQ/strategy Guide, Jun. 26, 2012, https://gamefaqs.gamespot.com/pc/605285-crusader-kings-ii/faqs/64442 (Year: 2012).*
YouTube video—Crusader Kings 2 Extended Tutorial, Part 4. Military Planning, Education and obtaining claims, Mar. 17, 2013, https://www.youtube.com/watch?v=6udYLOZOTul&t=468s (Year: 2013).*

* cited by examiner

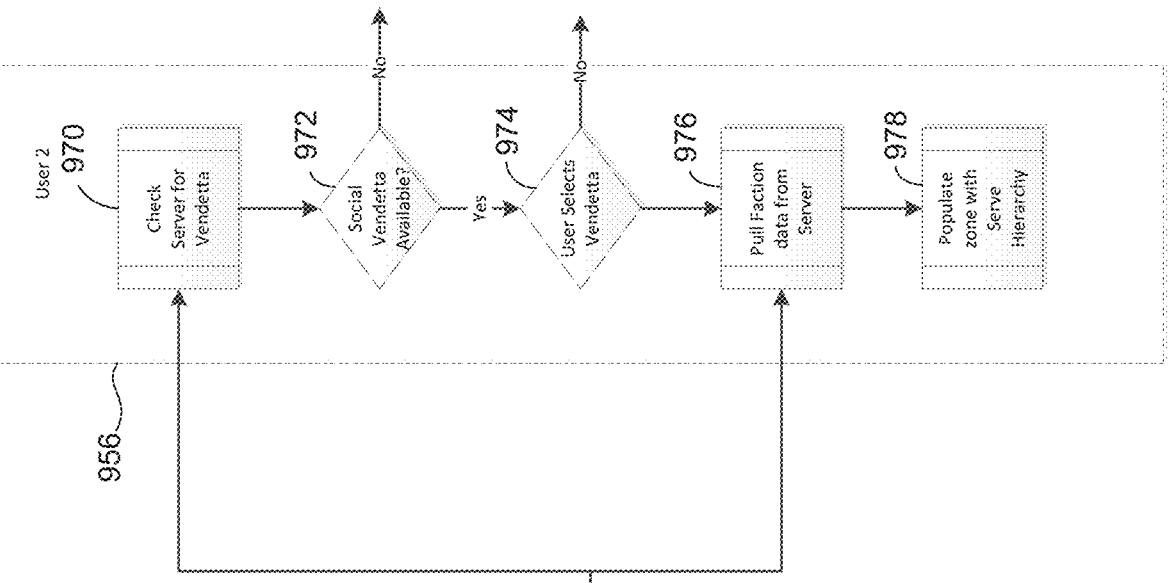
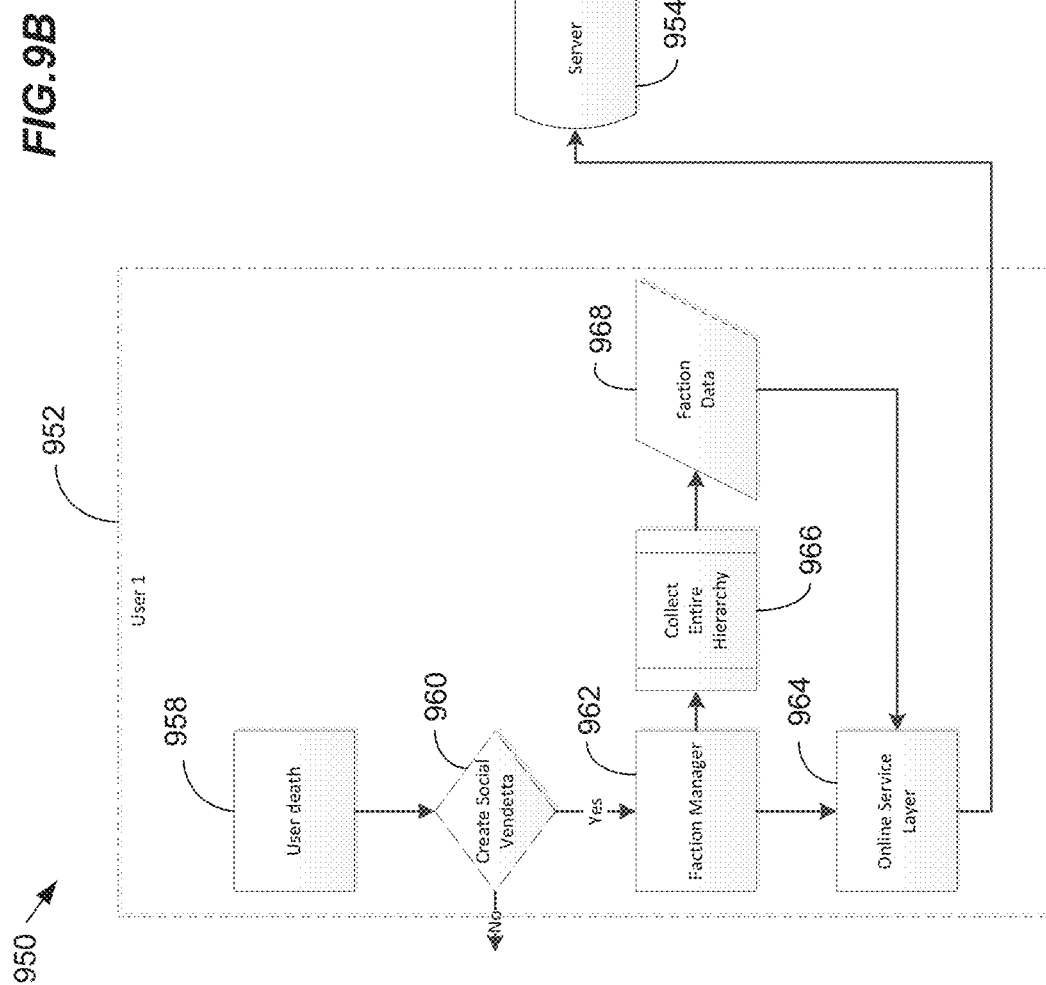
FIG.9B

FIG. 11

```
1100
  ↓
┌─────────────────────────────────────────────────┐ 1110
│ CONTROLLING, BY A PROCESSOR, GAME EVENTS IN A   │
│ COMPUTER-IMPLEMENTED GAME, THE GAME EVENTS      │
│ INVOLVING AN AVATAR THAT IS OPERATED IN RESPONSE│
│ TO INPUT FROM A PLAYER, AND A FIRST NON-PLAYER  │
│ CHARACTER THAT IS CONTROLLED IN RESPONSE TO A   │
│ FIRST SET OF CHARACTER PARAMETERS DEFINED IN A  │
│ COMPUTER MEMORY AND IN RESPONSE TO OPERATION    │
│ OF THE AVATAR                                   │
└─────────────────────────────────────────────────┘
                     ↓
┌─────────────────────────────────────────────────┐ 1120
│ DETECTING, BY THE PROCESSOR, OCCURRENCE OF A    │
│ PREDEFINED GAME EVENT INVOLVING THE NON-PLAYER  │
│ CHARACTER                                        │
└─────────────────────────────────────────────────┘
                     ↓
┌─────────────────────────────────────────────────┐ 1130
│ CHANGING, BY THE PROCESSOR, THE FIRST SET OF    │
│ CHARACTER PARAMETERS OR A SECOND SET OF CHARACTER│
│ PARAMETERS DEFINED IN A COMPUTER MEMORY FOR     │
│ CONTROL OF A SECOND NON-PLAYER CHARACTER IN THE │
│ GAME, BASED ON THE DETECTING                    │
└─────────────────────────────────────────────────┘
                     ↓
┌─────────────────────────────────────────────────┐ 1140
│ OUTPUTTING, TO AN OUTPUT DEVICE, AN INDICATION OF│
│ THE FIRST OR SECOND SET OF CHARACTER            │
│ PARAMETERS THAT ARE CHANGED BY THE CHANGING     │
└─────────────────────────────────────────────────┘
```

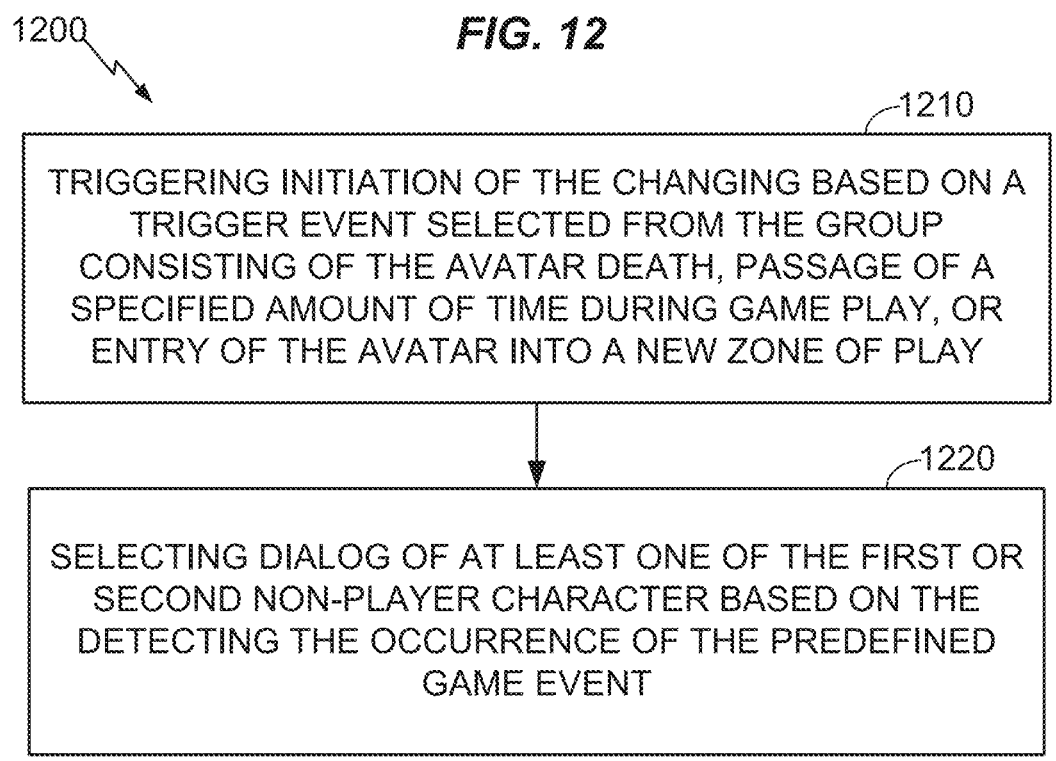

CHANGING THE CHARACTER PARAMETERS

↓

1310

DETERMINING A CHANGE OF A STATUS OF THE NON-PLAYER CHARACTER IN A FACTION OF NON-PLAYER CHARACTERS, BASED AT LEAST IN PART ON THE ONE OF THE GAME EVENTS

↓

1320

THE FACTION IS A RANKED HIERARCHY OF THE NON-PLAYER CHARACTERS IN WHICH RANK IS POSITIVELY CORRELATED WITH GAME PLAYING POWER, AND CHANGING THE CHARACTER PARAMETERS COMPRISES CHANGING A RANK OF THE SECOND NON-PLAYER CHARACTER IN THE HIERARCHY

↓

1330

CHANGING THE CHARACTER PARAMETERS COMPRISES DESIGNATING THE SECOND NON-PLAYER CHARACTER ONE OF: A RANKED MEMBER OF THE HIERARCHY, OR A NON-MEMBER OF THE RANKED HIERARCHY

↓

1340

CHANGING A STATUS PARAMETER OF A THIRD NON-PLAYER CHARACTER IN THE FACTION, BASED ON THE CHANGE OF THE STATUS OF ONE OR BOTH OF THE FIRST AND SECOND NON-PLAYER CHARACTER

NEMESIS CHARACTERS, NEMESIS FORTS, SOCIAL VENDETTAS AND FOLLOWERS IN COMPUTER GAMES

CROSS-REFERENCE TO RELATED APPLICATIONS

This application claims priority pursuant to 35 U.S.C. § 119(e) to U.S. provisional application Ser. No. 62/303,738 filed Mar. 4, 2016 and Ser. No. 62/138,920 filed on Mar. 26, 2015, which are hereby incorporated by reference, in their entireties.

FIELD

The present disclosure relates to the design and operation of video games for operation in a computer, for example control and configuration of non-player characters and related game features.

BACKGROUND

Interactive video games for play on a personal computer or gaming console are sometimes programmed to include non-player characters that interact with player avatars in various ways. For example, it is common in first-person shooter and similar games for the player to face and be required to overcome various hazards caused by an onslaught of non-player characters. Once overcoming these hazards the player may be required to beat a "boss character" to advance to a new level of play. This style of play is almost as old as video games themselves. Non-player characters in such games are provided with programmed behaviors that do not change during game play, apart from random variation that may be built into an algorithm for controlling the character.

To add interest to game play, non-player characters have been programmed to act differently depending on which branch of a narrative tree a player is following. If the player decides to take a certain action in a narrative story line, the non-player character will follow a corresponding script. If the player decides to follow a different branch of the story line, the same character may execute a different script.

In games that permit player dialog, non-player character have been programmed to consult a database of past player conversations, identify similar conversational topics, and determine what to say past on past similar conversations. One such character, called "Wandering Hal" or "Ultra Hal" by Zabaware™, uses a statistical analysis of past conversations in a database of past conversations to determine what to say in the context of a multi-user free-form virtual reality world that includes both player avatars and non-player characters. Wandering Hal keeps adding to its database with every conversation, and the phrases it uses in similar circumstances continually evolves based on changes in the database.

While these techniques for programming non-player characters may make game play more interesting, there are many aspects of non-player character development that prior methods are unable to achieve. The interactions and personalities of actual human characters are extremely complex, and prior system have not been able to provide a realistic degree of complexity that fits in appropriately with the flow of game play. Indeed, the possibilities for non-player character development within the context of different games are essentially unlimited. With such unlimited possibilities available, it is not readily apparent how to add interest to game play by evolving non-player characters in new and unexpected ways, without distracting from the player's engagement with the video game designed according to fast-paced styles of play, or unduly slowing the operation of typical gaming machines.

It would be desirable, therefore, to develop new methods and other new technologies for controlling non-player characters, or systems of non-player characters, that overcomes these and other limitations of the prior art, and enhances the appeal and enjoyment of various video games.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of the disclosure, a computer-implemented method includes controlling, by a processor, game events in a computer-implemented game, the game events involving an avatar that is operated in response to input from a player, and a first non-player character that is controlled in response to a first set of character parameters defined in a computer memory and in response to operation of the avatar. The method may further include detecting, by the processor, occurrence of a predefined game event involving the non-player character. Numerous different types of events may be defined.

A non-player character that evolves in reaction to game events may be referred to herein as a "nemesis." A nemesis may oppose or challenge an avatar in game play. For example, the player may be unable to reach a next game level without "killing" or disabling a nemesis. A nemesis may recover from a defeat or even death to challenge the player later in the game, while evolving in response to prior game events involving the nemesis or a different non-player character that has a factional relationship (e.g., being a member of the same faction, or of a rival faction).

Accordingly, the method may further include changing, by the processor, a second set of character parameters defined in a computer memory for control of a second non-player character in the game based on the detecting. In addition, or in the alternative, the method may include changing the first set of character parameters, based on the detecting.

In a related aspect, the method may include outputting, to an output device, an indication of the second set of character parameters (or if applicable, the first set of character parameters) that are changed by the changing operation. For example, the first or second non-player character may be given a different appearance, personality, behavior, or other characteristic that is evident to a player of the game through observing a display device and listening to audio output during game play.

In an aspect, the method may include triggering initiation of the changing operation based on a predefined trigger event. The trigger event may be any desired event, for example an event that relates to a narrative or dramatic fabric of the game. For example, a trigger event may be an avatar death, passage of a specified amount of time during game play, or entry of the avatar into a new zone of play.

In an aspect, changing the second set of character parameters may further include determining a change of status of the second non-player character in a faction of non-player characters, based at least in part on the one of the game events. In general, game play may depend partly on status of non-player characters in the faction. As a non-player character moves up a hierarchy of the faction, for example, their game power may increase. Accordingly, in embodiments wherein the faction is a ranked hierarchy of the non-player characters in which rank is positively correlated with game playing power, changing the second set of character parameters may include changing a rank of the second non-player character in the hierarchy, or designating the second non-player character one of a ranked member of the hierarchy, or a non-member of the ranked hierarchy. In a related aspect, the method may include changing a status parameter of a third non-player character in the faction, based on the change of the status of one or both of the first and second non-player character. The status or other control parameters of multiple non-player characters may be changed based on a game event.

The character parameters may control various aspects of the non-player character's rendered appearance, behavior, power, or dialog. For example, changing the second set of character parameters may include changing a parameter controlling a rendered appearance of the second non-player character, a behavioral personality trait of the second non-player character, a game-playing ability of the second non-player character, or a player interaction score that increases a probability that the second non-player character will succeed in future interaction with the player's avatar. Each of these changes may likewise be made to parameters controlling the first non-player character, or some other non-player character. Character traits may include membership in a particular "tribe" or group of non-player characters. Members of the same tribe or group share selected behavioral traits or preferences that are characteristic of the tribe.

In another aspect, the method may include selecting dialog for at least one of the first or second non-player character, based on the detecting the occurrence of the predefined game event. For example, the dialog may be selected to indicate a memory of or reaction to the game event, the next time the non-player character interacts with the player's avatar.

In other aspects, character parameters may control the characteristic of a "fort" or other power center that appears in a video game. A "power center" may be a swath of virtual territory, virtual building, or virtual vessel occupied by a non-player character that the game engine treats as increasing the power of the character to influence the game action. Forts, battleships, tanks, and aircrafts are examples of power centers in military-style video games. An association of a non-player character to a power center changes the characteristics of the power center based on the current character parameters. In an aspect, character parameters may be specifically directed to power center attributes only, or to both power center and other character attributes.

The game methods may include sharing of aspects of a faction that have evolved during a first player's game play with other players, via a feature generally referred to herein as a "social vendetta." A social vendetta opportunity may be generated by the game engine in reaction to certain events, such as defeat of the first player's character by a non-player character, or input from the first player requesting creation of a social vendetta. To configure the social vendetta, a server obtains all the character parameters of the first player's faction, and makes these parameters available for use in games played by other players. Other players can chose the social vendetta and download the associated character parameters to their own game, where they can play against the faction for as long as desired. Once finished with the social vendetta, another player can upload the now-altered faction parameters back to the server from whence the first player (or in some embodiments, other players) can download them and resume play using the faction parameters as the other player left them.

The method of game play may be implemented in any suitable programmable gaming device, by provided program instructions in a non-transitory computer-readable medium that, when executed by a computer processor, cause the gaming device to perform the described operations. Other elements of the gaming device may include, for example, a display screen, an audio output device, and a user input device, which participate in the execution of the method. In some embodiments, the game device may include a network interface for communicating with a game server, with other gaming devices, or both via a computer network of gaming machines. Aspects of the method may include operations performed cooperatively by the computer network of gaming machines, and a system may include different nodes of the network that cooperatively execute operations of the method. In addition to personal computers and game consoles using video display screens or projectors, a gaming device may include a virtual reality device, such as a headset or other display that reacts to movements of a user's head or body to provide the impression for the user of being placed inside of the rendered scene in which the game is played.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIG. 9B is a flow chart illustrating aspects of a method for sharing faction parameters according to a social vendetta feature.

FIGS. 11-16 are flow charts illustrating aspects of a method or methods of game play for controlling evolution of a nemesis.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1A:
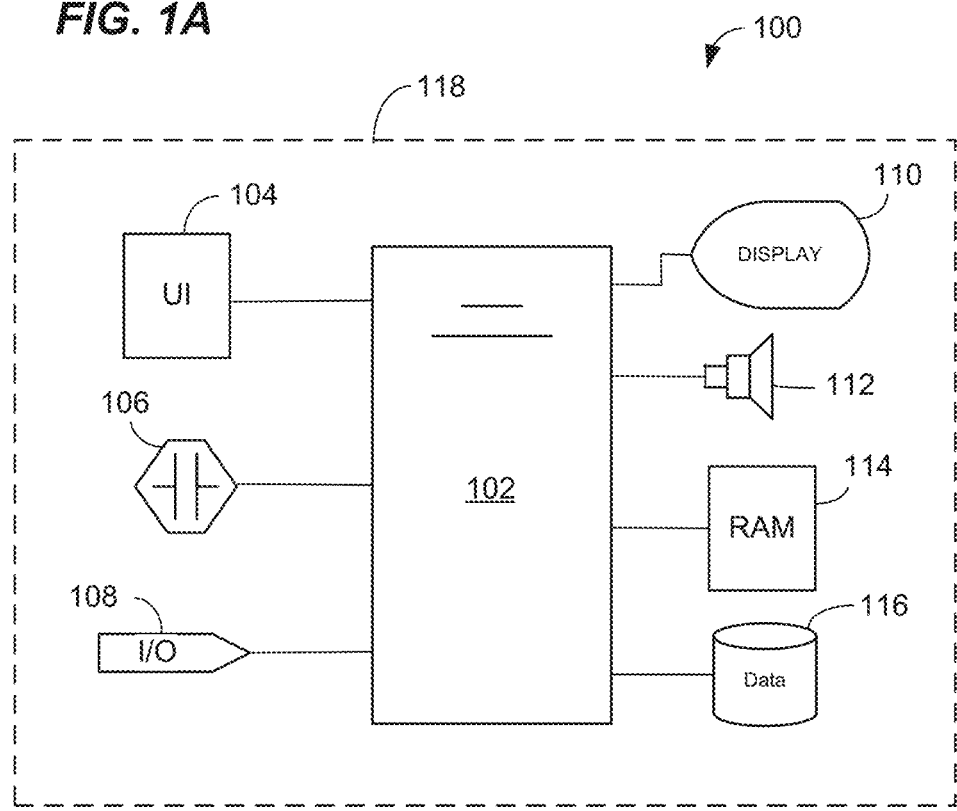
FIG. 1A is a schematic block diagram illustrating aspects of a gaming device for performing methods of game play as described herein.

Referring to FIG. 1A, aspects of a gaming device 100 for performing methods of game play as described herein are illustrated. A gaming device 100 may include, for example, a processor 102, for example a central processing unit based on 80x86 architecture as designed by Intel™ or AMD™, or a system-on-a-chip as designed by ARM™. The processor 102 may be communicatively coupled to auxiliary devices or modules of the gaming device 100, using a bus or other coupling. Optionally, the processor 102 and some or all of its coupled auxiliary devices or modules (examples of which are depicted at 104-116) may be housed within or coupled to a housing 118, for example, a housing having a form factor of a personal computer, gaming console, smart phone, notepad computer, laptop computer, set-top box, or other form factor.

A user interface device 104 may be coupled to the processor 102 for providing user control input to a game process operated by a game engine executing on the processor 102. User control input may include, for example, selections from a graphical user interface or other input (e.g., textual or directional commands) generated via a touch screen, keyboard, pointing device (e.g., game controller), microphone, motion sensor, eye movement sensor, body movement sensor, camera, or some combination of these or other input devices. Game input may also be provided via a sensor 106 coupled to the processor 102. A sensor may comprise, for example, a motion sensor (e.g., an accelerometer), a position sensor, a temperature sensor, a location sensor (for example, a Global Positioning System (GPS) receiver and controller), an image sensor or sensor array, or a microphone. The sensor 106 may detect a motion or other state of a user interface display, for example, motion of a virtual-reality headset, or the bodily state of the user, for example, skin temperature or pulse.

The device 100 may optionally include an input/output port 108 coupled to the processor 102, to enable communication between a game engine and a computer network. Such communication may be used, for example, to enable multiplayer games. The methods described herein may be adapted for use with multiplayer games, or with single player games. In a single player game, non-player characters, including nemesis characters, interact with a single player. In a multi-player game, non-player characters may evolve similarly, and interact with multiple different players at the same time, or at different times.

A display 110 may be coupled to the processor 102, for example via a graphics processing unit (not shown) integrated in the processor 102 or in a separate chip. The display 110 may include, for example, a flat screen color liquid crystal (LCD) display illuminated by light-emitting diodes (LEDs) or other lamps, a projector driven by an LED display or by a digital light processing (DLP) unit, or other digital display device. The display device 110 may be incorporated into a virtual reality headset or other immersive display system. Video output driven by a game engine operating on the processor 102 may be provided to the display device 110 and output as a video display to the user (also referred to herein as the "player"). Similarly, an amplifier/speaker or other audio output transducer 112 may be coupled to the processor 102 via an audio processing system. Audio output correlated to the video output and generated by the game engine may be provided to the audio transducer 112 and output as audible sound to the user.

The gaming device 100 may further include a random access memory (RAM) 114 holding program instructions and data for rapid execution or processing by the processor during game play. When the device 100 is powered off or in an inactive state, program instructions and data may be stored in a long-term memory, for example, a non-volatile magnetic, optical, or electronic memory storage device 116. Either or both of the RAM 114 or the storage device 116 may comprise a non-transitory computer-readable medium holding program instructions, that when executed by the processor 102, cause the device 100 to perform a method or operations as described herein. Program instructions may be written in any suitable high-level language, for example, C, C++, C #, or Java™, and compiled to produce machine-language code for execution by the processor. Program instructions may be grouped into functional modules, to facilitate coding efficiency and comprehensibility. It should be appreciated that such modules, even if discernable as divisions or grouping in source code, are not necessarily distinguishable as separate code blocks in machine-level coding. Code bundles directed toward a specific type of function may be considered to comprise a module, regardless of whether or not machine code on the bundle can be executed independently of other machine code. In other words, the modules may be high-level modules only.

Figure 1B:
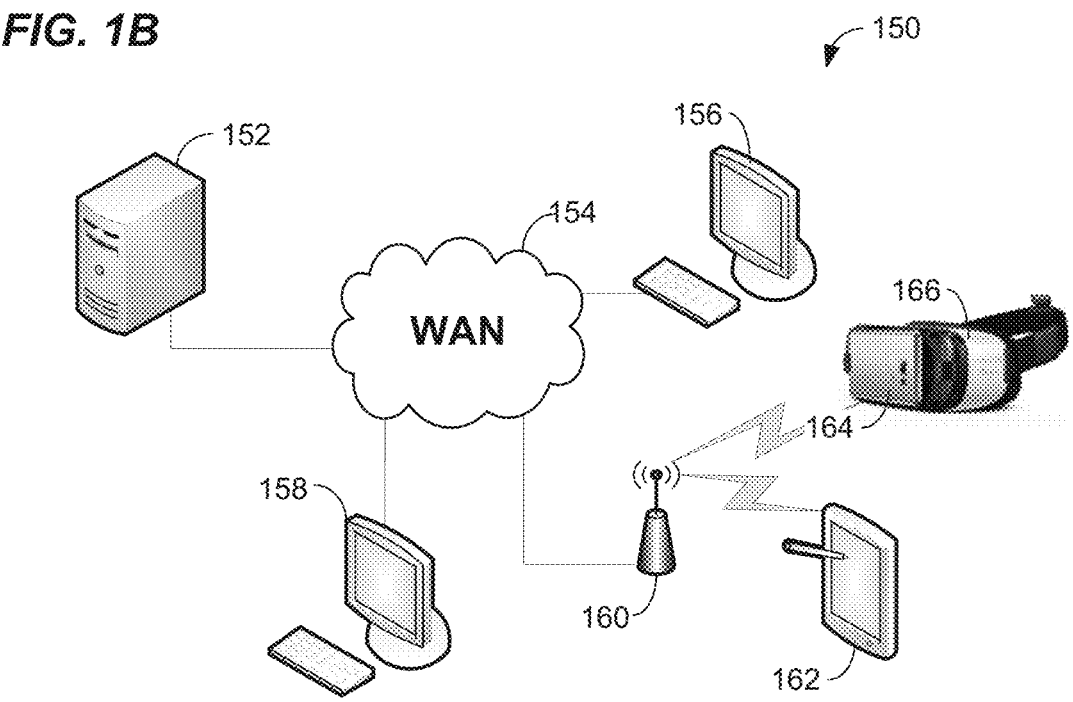
FIG. 1B is a schematic block diagram illustrating aspects of computer network system for performing methods of game play as described herein.

Referring to FIG. 1B, aspects of a network system 150 for sharing data between game devices executing game processes as described herein may include a game server 152 in communication with one or more game devices 156, 158, 162 and 164 via a wide area network 154, for example, the Internet. Game devices 156, 158 represent generally non-mobile computers (e.g., desktop or laptop computer) that are usually connect to the WAN 154 through a Local Area Network or modem connected to an Internet host (not shown). Game devices 162, 164 represents generally mobile computers (e.g., smart phones or notepad computers) connected via a wireless access point 160 of a cellular or other wireless network (not shown). Mobile computers may be assembled in virtual reality (VR) headsets, for example, smartphone 164 may be attached to the VR headset 166. Dedicated VR headsets (without removable computer) or augmented reality (AR) headsets may also be used as output devices. Game server 152 may provide game engine applications to game devices via any suitable data transfer process over a computer and/or wireless network. In addition, the game server 152 may host a client service whereby any one of the game devices 158, 156, 162, 164 may share game-related data or rewards with any other of the game devices 158, 156, 162, 164 for example for a social vendetta feature described herein. In an alternative, game devices may communicate game data directly with one another via a peer-to-peer (P2P) network. Any suitable network communication process or P2P process as known in the art may be used to communicate game data between devices.

Figure 2:
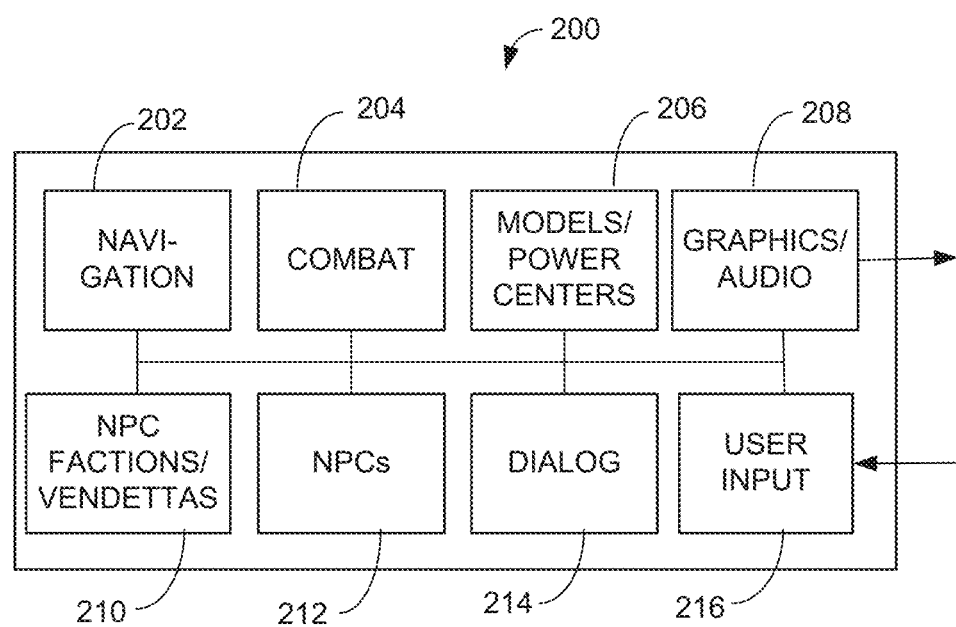
FIG. 2 is block diagram illustrating aspects of functional modules making up an application for performing methods of game play as described herein.

FIG. 2 illustrates aspects of functional modules making up an application for performing methods of game play, for example, a game engine 200. A game module may also include other modules, for example a database module holding game and parameter data or a chat module, which are not illustrated. Data signals generated by a user input device may be provided to a user input processing module 216. Based on the data signals and the context in which received (e.g., game state at time of receipt), the data processing module 216 may set variables or write data to memory locations that are used by other modules of the game engine 200, operating concurrently or sequentially with operation of the user input module 216. More detailed algorithms for performing functions of the game engine are described elsewhere below.

A navigation module 202 may manage position and movement of the player's avatar, or players' respective avatars, through a world map established for a particular game, in response to player input, map features, event outcomes and other game states, including positions and states of non-players characters. The navigation module may similarly manage position and movement of non-player characters through a world map. It should be appreciated that a world map may be divided into different levels. The navigation module may control access of a player avatar to different levels. For example, a player may be required, via limits placed on the player's avatar, to complete a certain task before advancing to a next level. As used herein, the game avatar controlled in response to player input so as to represent the player in game play may sometimes be referred to as the "player avatar."

A combat module 204 may manage adversarial encounters between avatars, between avatars and non-player characters, or between non-player characters. The module 204 may determine outcomes of encounters in response to player input, status of avatar parameter's, status of non-player character parameters, presence of accessory objects (e.g., weapons, charms, etc.), game location, game time, or other inputs. Examples of non-player character parameters are provided later in the specification. Non-player characters may sometimes be referred to as "bots" or "robots" in the context of computer games. The combat module may generate actions of non-player characters based on character parameters using a code that randomly generates actions, selects from a set of available actions, or both. The combat module may compare then player avatar action, player avatar parameters, non-player character actions, and non-player parameters, and determine an outcome. For example, a combat encounter may be coded as a "do" loop of processes that are repeated until the loop is exited, either by defeat of one of the parties or some other terminal event. For further example, the combat engine can decrement (and in some cases, increment) a health status of the player avatar and the non-player character, based on their respective actions (which may, in turn, depend on their traits). Once a health status is depleted to zero, the combat is over and the remaining player or character is the winner. This simple model may be varied, as desired. Once an outcome of an encounter is determined, the module 204 may record a result for use by other modules of the game engine 200. In addition, the combat module 204 may provide information regarding progress of the combat to a render function in the audio-video output module 208, so the player can view progress of the combat while participating in it, or while merely observing it if between non-player characters.

A model management module 206 may manage three-dimensional or two-dimensional models used for rendering non-player characters. The module 206 may alter a state of these models in response to changes in non-player character parameters or avatar parameters. For example, the combat module 204 may provide an indication that a character lost a combat event by suffering a particular type of injury. In response to the indication, the model management module 206 may alter a texture and/or geometry of the model to reflect a scar from the particular injury suffered. The next time the non-player character is rendered, the scar will appear where there was none before. In another example, the model management module 206 may alter parameters of a power center used by a non-player character, for example a fort, based on character parameters of the highest-ranking non-player character associated with the power center. The character parameters may be static (e.g., character tribe or name) or variable (e.g., acquired traits, rank, or achievements). Traits may be assigned to the NPC that relate specifically to attributes of the power center. For another example, the power center may be configured based on the tribe of the associated NPCs. The game engine may control dramatic visual modifications to a nemesis fort, based on the identity of the overlord's tribe. For instance, a "Beastmaster" overlord's fort may be adorned with large game-hunting trophies over many surfaces. A "Regal" overlord's fort may have golden accents on the walls and stately accoutrements spread throughout. For example, "fort" traits assigned to a character may include "fire spouts" that will spew fire on enemy NPCs, "wall spikes" that prevent enemy NPCs from scaling fort walls, and "mines" that explode on contact by enemies. These traits may vary with time, based on the rank, exploits, victories and defeats of their associated overlord. For example, after a victory, the model management module may add a fort trait won by the overlord, or remove it after a defeat. Optionally, the power center may also be configured by the module 206 in response to lower-ranking NPCs in the chief NPC's faction.

A faction management module 210 may manage factional relationships between non-player characters in one or more factions, in response to game events. The module 210 may use factional relationships to determine which non-player characters are affected by a game event. For example, if a higher level character in a faction is killed, a lower-level character may be promoted. Accordingly, the module 210 may update and track changes in factional relationships. The module 210 may further use information about factional relationships to determine a nature of a parameter change. For example, if a first non-player character in a faction has a negative relationship with a second non-player character, and something negative happens to the first non-player character, parameters of the second non-player character may be changed in some positive way such as increased power or additional skills.

The faction management module 210 may also manage sharing of factional information between games played by different players. Managing of sharing may include, for example, detecting conditions that trigger the sharing of a faction with other players playing different games, and providing faction parameters to clients operated by the other players, optionally via a network server. Conditions that trigger faction sharing may include, for example, one or more events that indicate an inability of the player to make progress against a faction, or input from a player input device indicating selection of an option to share faction parameters. Once a social vendetta has been initiated, the faction management module 210 may further track progress of other players playing against the faction and sharing of any progress in the original game, subject to player control.

A non-player character module 212 may manage spawning and control of non-player characters in the game, based on the game state and current state of the non-player parameters. This module may provide artificial intelligence for controlling non-player character actions to simulate self-directed activity, optionally in response to activity by a player-controlled avatar, or in response to activity by another non-player character. "Spawning" refers to causing a non-player character to appear at a particular place on the game map, after being absent from the map for a period of time.

A dialog module 214 may control dialog assigned to non-player characters in response to past game events and changes in character parameters. Accordingly, the dialog of the non-player character will evolve as the character survives and accretes additional history. In this way, a nemesis character with some depth can be generated, which communicates using different phrases and meanings based on its history.

An audio-video output module 208 may generate an audio-video signal based on the current game state. A video output component may generate a video signal for a display device based on viewpoint, position, and lighting data, and on geometrical data for the game map, characters, avatars, and auxiliary objects, using a rendering engine. An audio output component may generate an audio signal based on dialog from the dialog component 214 and on other input.

It should be appreciated that every game feature described herein is implemented as a digital data structure existing in a computer memory and operated on by a game engine executed by a computer processor to produce video output rendering an animated output representative of the game. For example, a game "character" is implemented as a digital data set that includes character parameters. The game engine receives the character parameters and other input to a game process, and based on pre-programmed algorithms, determines a representation of a current game state that may include a depiction of the character to be rendered and then transformed into a video signal. Hence, qualities such as "traits," "rank," "factions," and other qualities shown or described herein relate to a virtual game world that, although analogous to a physical world and described as if real, can only be perceived by a user viewing, feeling, and listening to video game output from video, audio, or tactile output devices. In the machine-implemented reality of the game, these qualities refer only to digital data objects existing in a computer memory in relation to operations executed by a computer processor, that cause video, audio, or tactile outputs when provided to suitable output devices. The data structures may be implemented in various forms that will be understood by one of ordinary skill, based on the present description of game operation and output. Such data objects and relationships between them exist in a larger data structure that maps the game state as it progresses, which may be referred to as a game state data structure, or similar terminology.

Figure 3:
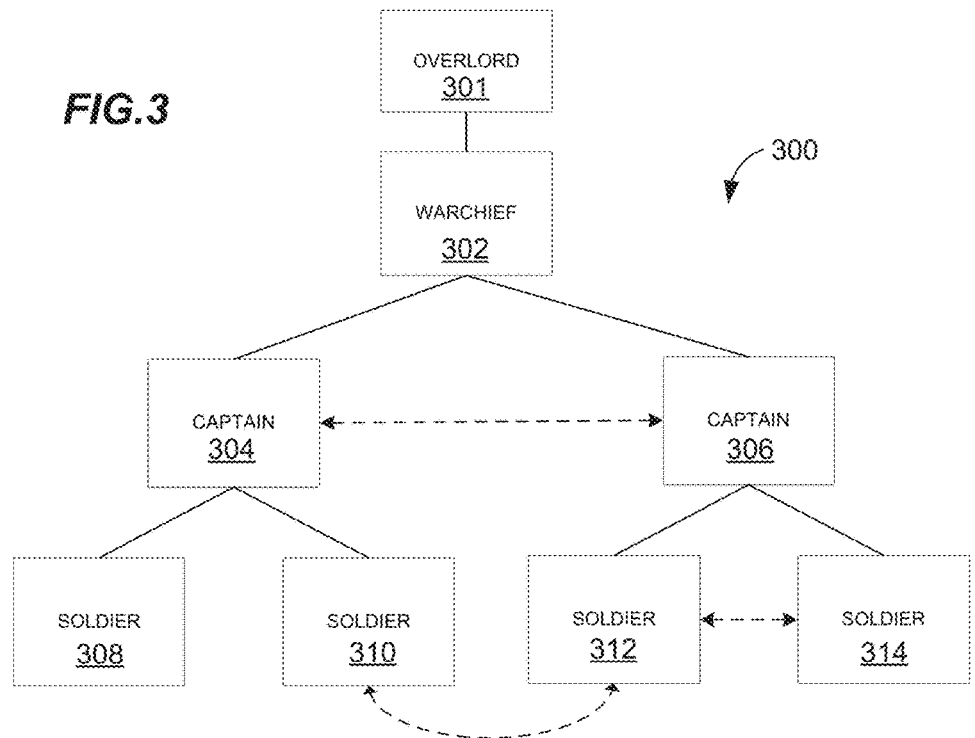
FIG. 3 is a concept diagram illustrating aspects of various hierarchical and non-hierarchical relationships within a faction of non-player characters.

FIG. 3 illustrates examples of of various hierarchical and non-hierarchical relationships within a faction 300 of non-player characters managed by a game engine, for example, by a faction manager module. Other factions with different relationships may also be useful.

In the illustrated faction 200, for example, an overlord non-player character 301 may reside at the top of the hierarchy 300. A warchief non-player character 302 may be placed under the overlord 301. If no warchief has attained the rank of overlord, the highest rank in a faction may be a warchief. The game may include a set number of warchiefs (for example, five) each set over a faction. Each warchief have the absolute loyalty of the captains 304, 306 that make up their bodyguard and may be much tougher than captains. In an aspect of game play, the game engine may withhold warchiefs, but not captains, from game play initially. The game engine may require warchiefs to be drawn out by having a dominated nemesis bring one out or complete a mission that will attract the warchief's attention. In another aspect, a warchief may possess privileges, skills or powers that characters of lower rank cannot have. For example, warchiefs may be immune from death threats, except from characters of a certain rank, such as captain. Warchiefs may respond to threats by increasing their bodyguard count. A warchief may have non-hierarchical relationships (not shown) with warchiefs of other factions, for example, rivalries or alliances.

Captains 304, 306 may be the most common rank of nemeses active in game play. Each warchief may be above one or more captains; two are shown in FIG. 3 for illustrative simplicity, but greater numbers of captains may also be used. Captains may be much more powerful than the regular soldiers by possessing traits that gives them increased power, while also giving them specific weaknesses to exploit. Captains may sometimes be in the service of a warchief, being their loyal bodyguard, and will join with them when they appear in the region. These non-player characters may be the most dynamic as they are the ones who fight and complete missions to increase their power if left unaccounted. Captains may also be death threatened, by soldiers or other captains. A captain may have non-hierarchical relationships (shown in dashed line) with captains in the same faction, for example, friendships or rivalries.

Soldiers 308, 310, 312, 314 may reside at a third (lower) level of the faction 300 hierarchy, below the captains 304, 306. Although two soldiers are depicted per captain, a single soldier, or more than two soldiers, may also be used. Soldiers may be most common foe that a player avatar meets during game play. A soldier may be promoted to captain in response to certain game events. For example, a soldier may be promoted for accomplishing some great feat, such as killing the player avatar, killing a captain, or may be assigned an "opportunist" trait rendering the character capable of taking up the empty position of a recently deceased captain. Any soldier is capable of becoming a captain, and a soldier may be "dominated" and won over by a player avatar. Accordingly, a player may, by allowing their avatar to be killed by a regular soldier that that the player has dominated, obtain a more power captain status for the dominated character. This may help the player progress in the game. In addition, a soldier may have non-hierarchical relationships (shown in dashed line) with soldiers in the same faction, for example, friendships or rivalries.

As used herein, a "faction" refers to a hierarchy of non-player characters as shown in FIG. 3. Similarly to factions, a game engine may enable and track a hierarchy of NPC "followers" at the head of which the player avatar is placed. Follower hierarchies may be used to enrich relationships between the player avatar and NPCs. In follower hierarchies NPCs, are aligned with the user and may be used to further user's game objectives. In addition to users forming antagonistic relationships with enemy NPCs, users can build positive experiences with follower NPCs based on reciprocal support. Just as enemy NPCs may gain power through events as detailed herein, Followers will gain experience and traits to encourage further user engagement with the NPC. For instance, a follower NPC may have the "savior" trait and save the user from most certain death. By successfully saving the user the follower will gain power and the potential to speak to his feat upon the next encounter with the user. By manipulating his followers a user can affect an enemy nemesis fort to his advantage. By enabling a user to surreptitiously insert followers into the enemy hierarchy, the user can be enabled to establish a secret alliance within an enemy fort. For example, a follower assigned to an enemy fort may open the front gate or destroy a wall upon user confrontation.

Figure 4:
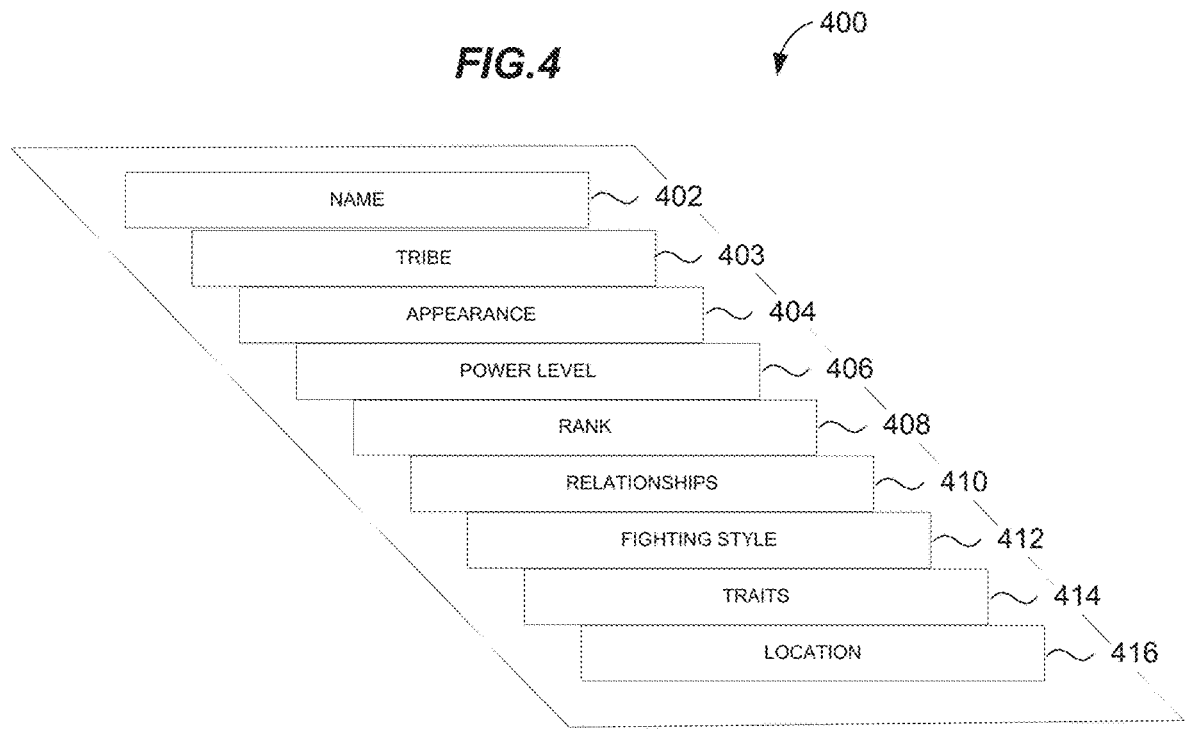
FIG. 4 is a diagram illustrating a record of various character parameters for controlling a non-player character.

FIG. 4 is a diagram illustrating a record of various character parameters 400 for controlling a non-player character, for example, a nemesis character. Character parameters may change during the course of a game, and may be saved and organized as game data in a relational database or other data structure. Nemeses characters may be randomly named non-player character enemies that are generated uniquely with each play through of the game. Each nemesis may be assigned its own personality and will rise or fall within their social structure as the game progresses. Nemeses may be affected by player avatar's actions, and each will react differently to player avatar's incursion into the game map, be it by fighting, fleeing, or by some other reaction. When a player avatar defeats a nemesis character, the game engine may reward the player with credits (e.g., "Runes") that increase the power of the player avatar's weapons.

Nemeses may be defined by many different parameters 400 maintained in game data. The depicted parameters 400 are merely examples, and other parameters may also be useful. Each nemesis may be assigned their own unique name and title 402, for example, by random initial assignment of one name and one title for each NPC from a list of possible names and titles, at the time game play is initiated. These assigned names may be unique to each character, and remain assigned to the same NPC for the duration of the game. If a new game is initialized, new names and titles may be randomly assigned. Titles can be useful as they may tell the nemesis' habits and behavior. To achieve this, the game engine may assign some or all of each nemesis' traits based on its title.

The NPC parameters 400 may include an assignment to a specific tribe 403. The tribe assignment may be permanent such that it does not change over the course of a user play through a game. Members of the same tribe may share particular tendencies or characteristics, some of which may be unique to the tribe. Game play may be enriched by providing data defining a new tribe that includes new character traits or personalities not previously seen in the game.

The NPC parameters 400 may further include appearance parameters 404. Appearance parameters may be uniquely assigned to each character, and may include, for example, body type and body parts, hairstyles, behaviors, voices, animations, or other parameters. The personality, name and/or title of each nemesis may be related to its appearance parameters by rules defined in the game engine. Appearance parameters may be modified by the game engine, when a non-player character moves to different levels of a faction. For example, when a soldier is promoted to captain, the character may be assigned new weapons and armor befitting his personality, and likewise when a captain is promoted to warchief.

Limits may be applied to how much appearance parameters are allowed to change. The example, a game engine may limit a number of battle scars that the game engine applies to the NPC that recovers from apparently being "killed" in some combat event. Battle scars that change the NPC appearance may include, for example, burns, slash scars, metal plate, or bag covering face. The game engine may associate every possible apparent killing or defeat with one of the battle scars. For example, the game engine may apply a burn scar if the NPC has been killed by fire, or a metal plate if the NPC has been killed by a headshot with an arrow. If the NPC has been killed multiple times exceeding a predetermined limit, the game engine may apply a "bag covering face" appearance parameter, implying the NPC has become so disfigured as to be unrecognizable.

The NPC parameters 400 may further include power level parameters 406. The game engine may use power parameters to determine the base strength of a nemesis. The higher the number, the more powerful the nemesis in combat. For example, the power parameter may be used by the combat module to determine a rate at which the nemesis loses health when attacked, or a rate at which the nemesis causes a player avatar or another character to lose health, when the nemesis is attacking. As the nemesis power parameter increases, it may lose health more slowly, and/or cause its opponents to lose health more quickly, in combat simulations. The game engine may set a maximum level for power parameters that no character may exceed.

The NPC parameters 400 may further include rank parameters 408. The longer a nemesis stays a faction and remains in play, the more events it will complete successfully and the more experience it will seem to gain. Experience may be indicated by a prefix of the character rank, or lack of a prefix. For example, a lack of prefix may indicate that the character has either not succeeded in any missions or just entered the system. A "veteran" prefix may indicate that the character has completed a few successful missions. An "elite" prefix may indicate that the character has completed more than an average number of missions, or more than a defined threshold set higher than the "veteran" level. A "legendary" prefix may indicate that the character has successfully completed an unusually large number of missions, or more than a defined threshold that is set higher than the "elite" level.

The NPC parameters 400 may further include relationship parameters 410. The game engine may define different kinds of relationships nemeses. For example, the game engine may define a rivalry between two nemeses, and consequently the player may find these two doing missions against each other until one of them dies. Other relationships may include, for example, bodyguard, follower, or other relationship useful for game play. Several captain nemeses may be assigned as bodyguards to the warchiefs of the region, and caused to appear with the warchief to which assigned when the warchief is engaged or about to engage a player avatar in combat.

The NPC parameters 400 may further include fighting style parameters 412. The game engine may assign each a particular fighting style, based on the various fighting styles of non-player characters, which may depend on rank or other factors. These styles may be further enhanced by traits (described herein below) that give the character new fighting abilities or weaknesses. Fighting styles may include a follower style. Followers of a nemesis may be selected by the game engine to be a random assortment of non-player characters or non-player characters of the same type as the nemesis. For example, a "berserker" style captain may be followed by a small group of berserkers of lower rank. For further example, a nemesis may be followed by non-player characters that dress or appear similarly to him. For example, a blue-painted nemesis may have blue-painted followers.

The NPC parameters 400 may further include trait parameters 414, also called traits. Each trait defines one or more specific strengths or weaknesses that the nemesis has. Traits may be assigned to make each nemesis behave in a unique way and require various tactics to defeat. A list of traits in provided in the following paragraphs, merely as examples. It should be appreciated that different traits may be suitable for different types of games. The NPC parameters 400 may further include location parameters 416. Each location parameter defines the location of the nemesis in the region. If the nemesis is not on the map, a mission that will draw him out may still be located on the map. If a player avatar dominates that nemesis and is fighting enemies in that area, the game engine may cause the nemesis to join in the battle in defense of the player avatar.

Non-player character traits may include invulnerability strengths that may be used by the game engine to determine a degree of the character's resistance to various sources of damage. Strengths may have a single value for all instances, or may be scaled by a numeric weighting factor. The invulnerability strengths may include, for example:
 1. Invulnerable to Ranged Attacks: the character cannot be damaged by the player avatars ranged attacks.
 2. Invulnerable to Stealth: the character cannot be damaged by stealth takedowns.
 2. Combat Master: the character cannot be damaged by combat attacks or finishers.

Non-player character traits may include hate strengths that may be used by the game engine to determine how the character reacts to game events. A character with a specific hate strength may be caused to behave as if provoked by a corresponding type of event, which enrages them. A state of rage causes the nemesis to attack harder and boosts their abilities. For example, an enraged nemesis may regenerate more health faster. Hate strengths may include, for example:
 1. Hate of Bodyguard Suffering: the character becomes enraged when one or more of his bodyguards is attacked.
 2. Hate of Burns: the character becomes enraged when he burns.
 3. Hate of Caragors: the character becomes enraged at the sight of Caragors.
 4. Hate of Defeat: the character becomes enraged at low health.
 5. Hate of Morgai Flies: the character becomes enraged when hit by Morgai fly swarms.
 6. Hate of Ghûls: the character becomes enraged at the sight of Ghûls (a type of non-player character that does not participate in faction membership).
 7. Hate of His Master Suffering: the character becomes enraged when his master is hit.
 8. Hate of Graugs: the character becomes enraged at the sight of a Graug (a type of non-player character that does not participate in faction membership).
 9. Hate of His Rival: the character becomes enraged near a rival nemesis.
 10. Hate of Pain: the character becomes enraged when he is injured.

Non-player character traits may include attack strengths that may be used by the game engine to determine combat moves a nemesis may perform when in combat. Attack strengths may include, for example:
 1. Body Slam: the character picks up his opponent and throws them to the ground.
 2. Boomerang Throw: the character throws weapons which then return to him.
 3. Charge Attack: the character executes a running charge in a straight line.
 4. Fury Attack: the character performs a highly aggressive melee attack.
 5. Ground Pound: the character slams the ground hard causing damage in a radius.
 6. Heavy Attack: the character performs a high-damage melee attack that cannot be countered.
 7. Jump Attack: the character leaps far while striking.
 8. Mangler: the character executes multiple heavy attacks to the gut.
 9. Poison Cloud: the character drops a stunning cloud of poison if needed.
 10. Quick Shot: the character shoots multiple shots in rapid succession.
 11. Rapid Attack: the character executes multiple attacks that must be individually countered.
 12. Reposition/Grapple: the character swings its opponent around.
 13. Throat Grab: the character picks up its opponent by the throat.
 14. Wrecker: the character executes a devastating shield slam and impales an attacker.

Non-player character traits may include weapon strengths that may be used by the game engine to determine damage that the non-player inflicts on a player avatar or other character, when wielding a weapon. Weapon strengths may include, for example:
 1. Flaming Weapon: Weapon is on fire, increasing damage.
 2. Poison Weapon: Weapon inflicts a lingering poison.
 3. Savage Weapons: Weapon inflicts deep wounds that bleed over time.
 4. Explosive Arrow: Shoots arrows that explode on impact.

Non-player character traits may include miscellaneous strengths that may be used by the game engine to determine combat outcomes in some other way. Miscellaneous strengths may include, for example:
 1. Ambusher: the character launches ambushes against his enemies.
 2. Backlash: renders counter attacks ineffective against the character.
 3. Battle-Hardened: the character can't be dominated, needs to be killed.
 4. Blood Thirsty: the character recovers health from striking enemies.

5. Cautious: the character is averse to combat.
6. Deadly: the character attacks do much more damage than typical characters of the same rank and power.
7. Deflect: the character can deflect attacks.
8. Deflect and Counter, plus Quick Turn: the character can deflect attacks and follow with a counterattack, turns quickly.
9. Demanding Leader: the character (warchief only) attracts more Bodyguards.
10. Fast Runner: the character runs much faster than a normal character of the same rank.
11. Fearless: the character cannot be terrified, never flees.
12. Gang Leader: the character has a group of followers.
13. Humiliator: the character does not finish off weak opponents.
14. Initiative: the character tries to be the first to strike in combat.
15. Inspiring Presence: the character inspires nearby characters to attack simultaneously.
16. Monster Slayer: the character is able to kill monsters quickly and is resistant to their attacks.
17. No Chance: the character never offers victims a Last Chance.
18. Quick Turn: the character will turn around quickly if struck from behind.
19. Regeneration: the character continually heals rapidly.
20. Side Step: the character can dodge thrown daggers.
21. Skirmisher: the character attempts to back away from combat.
22. Sneaky: the character sometimes shows up unexpectedly.
23. Sniffer: the character can smell out enemies who are hiding nearby.
24. Summoner: the character calls nearby allies to join the fight.
25. Tracker: the character can sense the presence of nearby enemies and hunt them down.
26. Vault Breaker: the character blocks attempts to jump over him.
27. Wraith Stun Blocker: the character blocks the Wraith Stun attack from the front.

Non-player character traits may include vulnerability or damage weaknesses that may be used by the game engine to determine vulnerability of the character to various kinds of attack. A nemesis assigned a vulnerability may be killed more easily or even instantly by damage from a source to which the nemesis is vulnerable. Vulnerability weaknesses may include, for example:

1. Vulnerable to Combat Finishers: the character can be killed instantly or easily using combat finishers.
2. Vulnerable to Mounted Beasts: the character can be killed instantly or easily by mounted beasts.
3. Vulnerable to Stealth Finishers: the character can be killed instantly or easily using stealth finishers.
4. Vulnerable to Ranged Attacks: the character can be killed instantly or easily by a single Charged Headshot, Fire Arrow, or Shadow Strike.

Non-player character traits may include fear weaknesses that may be used by the game engine to cause the nemesis flee "in terror" from certain attacks. Fear weaknesses may include, for example:

1. Fear of Betrayal: the character becomes terrified when allied soldiers fight each other.
2. Fear of Burning: the character becomes terrified when he burns.
3. Fear of Caragors: the character becomes terrified at the sight of Caragors (a type of monster).
4. Fear of Ghûls: the character becomes terrified at the sight of Ghûls (a type of monster).
5. Fear of Graugs: the character becomes terrified at the sight of Graugs (a type of monster).
6. Fear of Morgai Flies: the character becomes terrified when hit by Morgai Fly swarms.
7. Fear of Rival: the character becomes terrified near rival nemesis.
8. Fear of the Gravewalker: the character becomes terrified at the sight of the player avatar.

Non-player character traits may include miscellaneous weaknesses that may be used by the game engine to cause the nemesis to be disadvantaged in combat in various ways. Miscellaneous weaknesses may include, for example:

1. Branded: the character can be grabbed, without needing to be weakened.
2. Clumsy: the character can be grabbed, without needing to be weakened.

In general, the game engine may cause a nemesis to lose weaknesses while gaining strengths, as the nemesis increases in power. Combat finishers may include combat moves such as ground execution, execution, wraith finisher, and wraith burn. The game engine may cause any nemesis with combat master status, which provides immunity to sword attacks, to always have at least one weakness, be it a fear or a damage weakness, so that the nemesis is not invincible.

Figure 5:
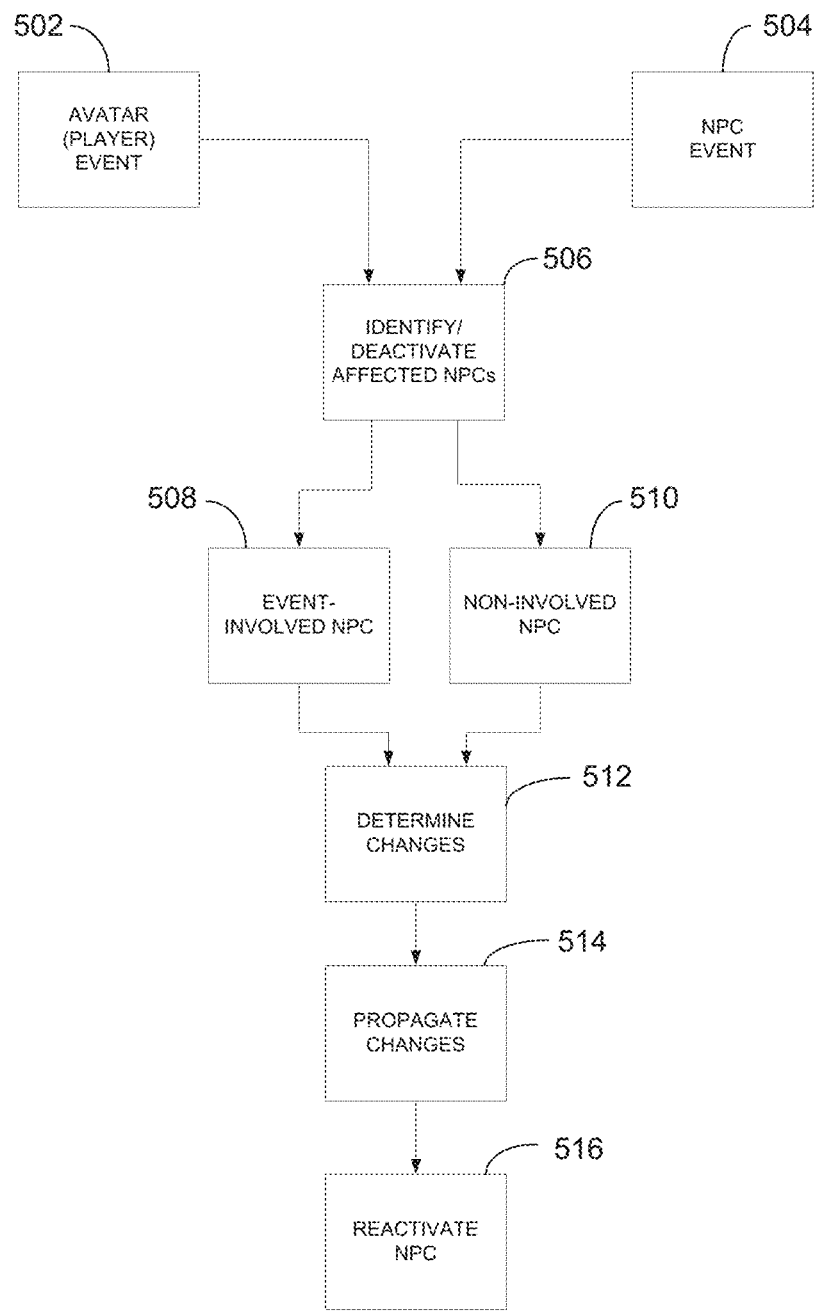
FIG. 5 is a flow chart illustrating general aspects of evolving non-player characters (NPCs) based on game events that involve the NPCs, or do not involve the NPCs.

Referring to FIG. 5, general aspects of a method 500 for evolving non-player characters (NPCs) based on game events that involve the evolving NPCs, or do not involve such NPCs may be initiated by a game event 502 involving the player avatar with or without an NPC, called an avatar event, or a game event 504 that involves only one or more NPCs, called an NPC event. Various events may be used to trigger and determine changes to non-player characters. Avatar events 502 may include, for example, outcomes of combat between an avatar and a nemesis, actions by an avatar or nemesis during combat, or outcomes of an encounter between an avatar and some other type of non-player character, for example a monster, swarm of pests, or force of nature. NPC events 504 may include, for example, death, defeat, victory, or other outcome of an encounter between NPCs.

The game engine may determine results of combat or other encounters using various factors, with a probabilistic determination algorithm. For example, results may be determined by NPC level or power, such that the higher the NPC level or power is relative to its opponent, the more likely the NPC will succeed. In the alternative, or in addition, results may be determined by the current mission type, with some mission types weighted towards failure (e.g. "executions"), and some towards success (e.g. "feasts"). In the alternative, or in addition, results may be determined by the player interaction score (PIS). An NPC's PIS may increased every time it interacts with the player avatar (i.e. it is developing a relationship with the player avatar), and the higher an NPC's PIS, the more heavily its odds towards survival/success may be weighed.

At 506, the game engine may identify and optionally deactivate affected NPCs. Identifying which NPCs are affected by an event may include identifying directly affected NPCs such as those participating directly in the event, sometimes called the event-involved NPCs 508. In addition, or in the alternative, identifying which NPCs are affected may include identifying those in a factional or other relationship to the directly affected NPCs, sometimes called the indirectly affected or non-involved NPCs 510. Not every related NPC need be affected. Instead, whether or not a related NPC is indirectly affected may depend on the type of the event and on the type of the relationship.

At 512, the game engine may determine changes to the affected NPCs, and save the determined changes in a reserve queue for later propagation to the NPCs. Changes may include any character parameters except for name and title. For example, changes may include level or power parameters that are used by the engine to determine character base levels, like character health and damage. Changes may include the character's position or rank in a factional hierarchy, for example whether a character is permitted to enter a faction, whether it is promoted from soldier to captain, whether a captain can become a bodyguard, or whether a captain can be promoted to warchief. Changes may include the character's role or appearance. When first entering a faction, the NPC will be assigned a role. This determines its visual appearance and can influence later dialog in the game. For example, a character assigned a "butcher" role may refer to the player avatar as "meat" and say he wants to cook him. Changes may include permanent death of the character, and removal from the game. Changes may include adding or removing traits and abilities. As an NPC level increases, desirable abilities (e.g. more powerful attacks) can be gained. Undesirable traits (e.g. vulnerabilities and fears) can be lost.

Accordingly, the game engine may cause a nemesis character to pass through missions and events to gain power. In an aspect, as long as the mission's objective is completed, the game engine may assign an increased power level to the nemesis, even if player avatar is the one who completed the mission. Detailed, non-limiting examples of nemesis character changes in response to events or completion of missions are listed below:

1. Promotion: A non-player character soldier enters the nemesis system to become a captain. After occupying a space on the bottom rung of the faction hierarchy, the solder may advance by either by killing a previous captain, or taking up the unoccupied space, and obtain a title and new armor. From there, the captain may attempt to go up into higher roles by either occupying an empty space on a higher row, or fight another captain for that spot. The game engine may cause less experienced captains to be much weaker than those who have experience in the faction, so these may be useful for easy domination or easy fodder for other captains to defeat and use to increase power.
2. Duel (Riot, for Warchief duels): One nemesis battles another non-player characters nemesis in an attempt to gain more power. The nemeses may be caused to battle with their followers cheering them on. If one or both of the nemeses is a warchief, the game engine may cause their bodyguards to also battle. The losing nemesis may flee the battle, which allows him to continue to live. The victor of the battle may gain a power level. If the player avatar decides to join in on the fight and kills off one of the nemeses, the survivor still gets the power level. The more cowardly non-player characters might not die from the duel because they fled the battle. The game engine may cause warchiefs to appear on the map in response to flight from battle.
3. Betrayal: A warchief's bodyguard nemesis may betray the warchief in attempt to take his rank. This may only be accomplished through domination, as bodyguards are programmed to be loyal to the very end. The betrayer and his followers may be required to fight all of the warchief's the bodyguard nemeses. There is a good chance that the betrayer will die without help if he fights multiple nemeses. If player avatar decides to interfere and kills the warchief, then the betrayer will gain a power level and become the new warchief immediately. If the betrayer dies, the warchief may become stronger and gain a power level.
4. Recruitment: A nemesis and a few of his followers attempt to gain new followers by killing several resistant groups of non-player characters. After the few who resisted are killed, the remainder joins up with the nemesis. The nemesis and his new followers then move on to the next group where they repeat the process. If the nemesis successfully does this three times in a row, they gain a power level.
5. Execution: A nemesis might decide to execute another nemesis and his followers. The executioner may line up the victim with some number (e.g., three) of his followers and execute them one by one, the victim being the last one. The followers of the executioner will watch from a short distance away cheering their leader on. If player avatar decides to kill the executioner, the surviving nemesis powers up. If the execution is successful, then the executioner gains a power level. It is possible for there to be no nemesis to execute, in which the executioner Nemesis may simply put four soldiers to the sword.
6. Survived: If a nemesis survives an encounter with player avatar (even if they don't fight), the game engine may assign the nemesis an increased power level.
7. Killed You: If the player avatar was dealt a killing blow by a nemesis, or soon-to-be nemesis, this may increases the NPC power level. Other nemeses that survived the encounter with the player avatar may also gain power levels when this happens. If the killing blow was by a soldier, the character may enter the nemesis faction as a captain.
8. Feast: In a feast, a nemesis is in the midst of celebration with his followers, which means there will be a lot of grog barrels over the feasting area. The barrels may create an opportunity for the player avatar to defeat a nemesis through explosions or grog poisoning. Feasts tend to attract many enemies of the player avatar, but the enemies are mainly in groups. A player may use well placed explosion shots or quick draw archers to defeat groups of enemies quickly. If the feast goes by uninterrupted, the hosting nemesis gains a power level.
9. Trial by Ordeal: The Nemesis is pitted against a beast of Mordor (non-player monster character) to show off his power to the other non-player characters. He will fight by himself against a Caragor (another type of non-player monster character) with his followers watching from a distance. If the nemesis is successful in the kill, he gains a power level. If unsuccessful, it will either die or survive and perhaps gain a fear of the creature. The player avatar may get involved by either killing the beast to let the nemesis gain the power level, or kill the nemesis while he is distracted by the fight. If the nemesis is under the player avatar's control, the player avatar may dominate the beast, causing both refuse to fight each other; in this case, no harmful or beneficial traits are gained.
10. Beast Hunt: similar to a Trial by Ordeal, in which the nemesis battles one or more monster characters with some of his followers. Success brings power. Failure brings death, or emotional trauma.
11. Ambush: A nemesis fights another nemesis, similar to a duel, however one nemesis and several of his followers will face waves of opposing non-player characters. After the second wave of non-player characters, either a much larger wave of non-player characters or the opposing nemesis will appear with the wave. Usually the ambushing nemesis will win, unless the player avatar participates. The nemesis that survives, or does not flee, will gain a power level. It is possible that there is no opposing nemesis, and the defending nemesis only has to fight off a few waves of non-player characters to succeed.

12. Death: What happens to a Nemesis after he "dies" in the System may be mainly dependent on the way he was killed. For example, if the Nemesis retains his head, there is a chance that it might return unexpectedly with scars, bags wrapped around his heads, metal eyepatches, or some combinations of them. It may return multiple times as long as his head was not cut off. If the head is cut off, the particular Nemesis will never return, and his head on a spire will appear in his spot in the faction display and serve as a reminder that player avatar has permanently eliminated that certain nemesis. Eventually his spot on the faction display screen may be taken by another nemesis, whether he comes back or not.

13. Kills a Monster: When a nemesis slays a monster, even when it is not a part of the power struggle he is performing, he will gain a power level for each one he slays. Players should be wary of this as this can be a good way of making a nemesis powerful quickly.

The player avatar may interact with the nemesis system in various ways to achieve his goals. Any of these can be used or ignored depending on the player's style of play. Detailed, non-limiting examples of player interactions and resulting changes to NPCs are listed below:

1. Dying: A player avatar may purposely fall to his enemies to quickly raise the power of the killer within the Nemesis System. For example, the avatar may be allowed to continually die to a particular nemesis to consolidate how powerful that certain non-player character gets. This way, the player avatar may either dominate the nemesis for a powerful servant or kill it for to obtain a more powerful benefit.
2. Gathering Intel: When a new nemesis enters the faction and has had no interaction with the player avatar, it will be represented by a silhouette in the faction display screen with no information about it. The player avatar may dominate any non-player characters to get information on these unknown nemeses. However, player avatar cannot discover traits of an unknown nemesis by interrogating regular soldiers, which only provides the name, power level, and location of the nemesis. The player avatar may only get the trait information from a captain, an intel drop, or a worm. The player avatar may only obtain intel on a warchief from captains or worms.
3. Interference: The nemeses will sometimes go off to do missions on their own and the player avatar may go to their locations to interfere with these tasks. It is up to player avatar if he wants to prevent, or allow the nemesis to succeed these missions. Usually, if the nemesis succeeds in its mission, it grows in power and if it fails, it either dies or flees.
4. Initiation: A player avatar may cause a captain to become a bodyguard for a warchief by making the captain do an initiation rite to prove his worthiness to the warchief. The mission type is Trial by Ordeal. The player avatar may interfere with the initiation to ensure or prevent the captain from joining the bodyguard of the warchief.
5. Death Threat: After obtaining the Death Threat skill, the player avatar can dominate any non-player characters, and have him deliver a death threat to a nemesis. Death threats to warchiefs can only be made through a captain. This will make the threatened nemesis stronger and lead him to surround himself with more gang members, but also increases player avatar's chances to gain epic runes for defeating him, which for captains is otherwise impossible.
6. Mission Creation: After dominating a nemesis, a player avatar can order the nemesis to start up a mission against another nemesis at any time. The player avatar may then focus on increasing his dominated nemesis' power level, by helping the nemesis complete these missions. The dominated nemesis can also draw out warchiefs, if prompted to, but only if that nemesis is a member of the warchief's bodyguard.
7. Dominating Soldiers: By dominating soldiers and allowing them to live, they might enter the faction already under your control. If the faction has an open captain position and time is advanced, an unknown captain immediately reveals himself under player avatar's control.

At 514, the game engine may propagate queued changes to all affected NPCs, for example by writing changed values to respective character parameter records of the NPC. A propagation operation 514 may be triggered periodically, or may be triggered by one or more events. For example, propagation may be triggered by the player avatar interacting with the mission marker in the world and passing to a new zone of the map, the player avatar passing time in the map screen, or by player avatar dying. If any affected NPC has been deactivated, if may be reactivated at 516 and returned to the game map.

Figure 6:
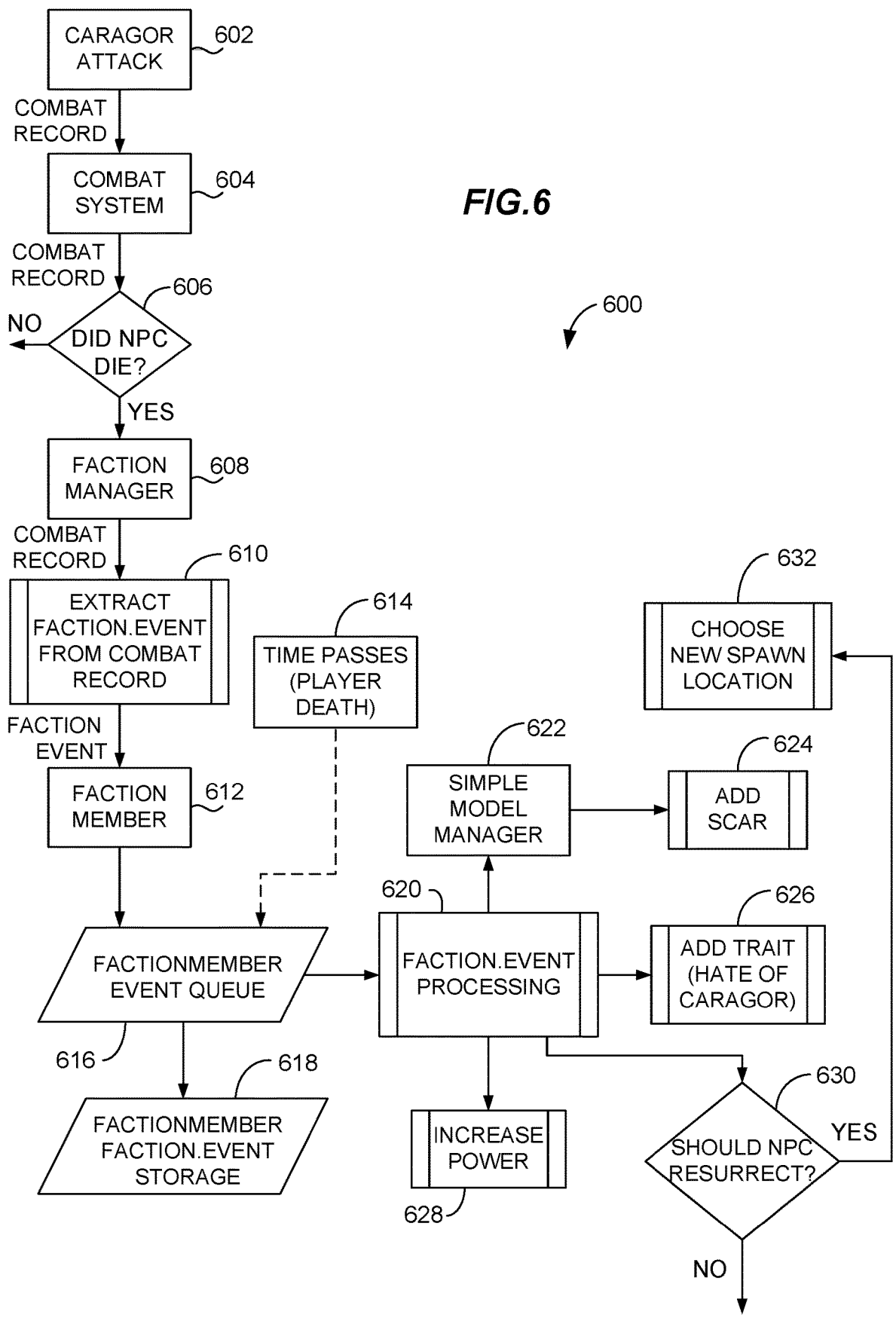
FIGS. 6 and 7 are flow charts illustrating more detailed aspects of evolving a non-player character based on a game event.

FIG. 6 illustrates a method 600 triggered by a monster non-player character ("Caragor") attack on a player avatar, by a game engine. The game engine may select a Caragor attack event 602 involving an NPC. In game play, a Caragor monster character attacks the NPC. The event 602 triggers creation of an input combat record that is used by a combat module 604 to determine a combat outcome based on parameters of the monster, the NPC, and a random variable. Based on the results of the attack, which the game engine may determine using a probabilistic method, the engine determines whether or not the NPC survived the attack at 606. At 608, the faction manager process generates a faction event record 610, based on a record of the combat outcome ("combat record"). For example, if the NPC did not survive (e.g., it "died"), it may be deactivated in the faction and replaced by another NPC that the faction manager selects. If the NPC did not die in the event, the faction manager may not generate a faction event record or may generate a different faction event record, and may alter a character parameter that increases the NPC's power or adds a capability. At 612, the game engine may associate the faction event record with a faction member. The game engine may likewise associate respective faction event records with respective NPCs, using a relational database or other data structure 618 in a memory of the gaming device.

The game engine may track NPCs that it flags as faction members, and NPCs that are not flagged as belonging to any faction. A combat event may cause a non-member to be promoted into a faction, may cause a faction member to be promoted in its faction's hierarchy, or may cause the NPC to be removed from the faction (e.g., by being "beheaded"). Updated faction event records and associations with NPCs may be maintained in a logical queue 616, awaiting some trigger 614 before the faction events are acted on. The event record queue may be stored in any suitable electronic record 618 accessible to the game engine. At 614, the game engine detects that a trigger for faction event processing has occurred. For example, the game engine may detect that the player avatar has "died" in some other game event, passed into a new zone of the game map, has fulfilled requirements for "leveling up" to a next level of play, or other triggering event.

The detection 614 may trigger faction event processing 620, which may read the queued faction event records and initiate parallel operations involving the NPC or NPCs associated with each record. For example, once initiated by a faction event process 620, a simple model manager process 622 may alter a model used for rendering the NPC. For further example, to display the aftermath of a wound suffered by the NPC, the model manager 622 may add a model of a scar 624 to model data. In the alternative, or in addition, faction event processing may alter another NPC character parameter, such as a trait 626. For example, to reflect an aftermath of a monster attack, the game engine may add a hatred and/or fear of the monster to the NPC's character traits. At 628, the game engine may also increase (or decrease) a record used for controlling the NPC's power level. The game engine may further determine, at 630, whether or when the NPC should be resurrected and re-enter game play. If resurrection is selected, the game engine may select a spawn location, at 632. If the NPC will not be resurrected, it may remain inactive until the next faction processing trigger, or removed from the remainder of the game.

Evolution of an NPC opponent may depend on caliber of the player's game play, via the faction system. Once an NPC is promoted to a faction, it can evolve and develop in reaction to game events. Game events, in turn, can depend on player skill and caliber of play. Skillful players may influence evolution of the NPC by causing events to occur that impede (or if desired, assist) progress of the NPC through the hierarchy. For example, a player may cause events to occur that strengthen an NPC's rivals in the hierarchy, such as by causing the game engine to increase power parameters of a rival, promote a rival, or assign favorable character traits to a rival. For further example, a player may cause events to occur that weaken the NPC, such as by causing the game engine to decrease power parameters of the NPC, or assign unfavorable character traits.

Figure 7:
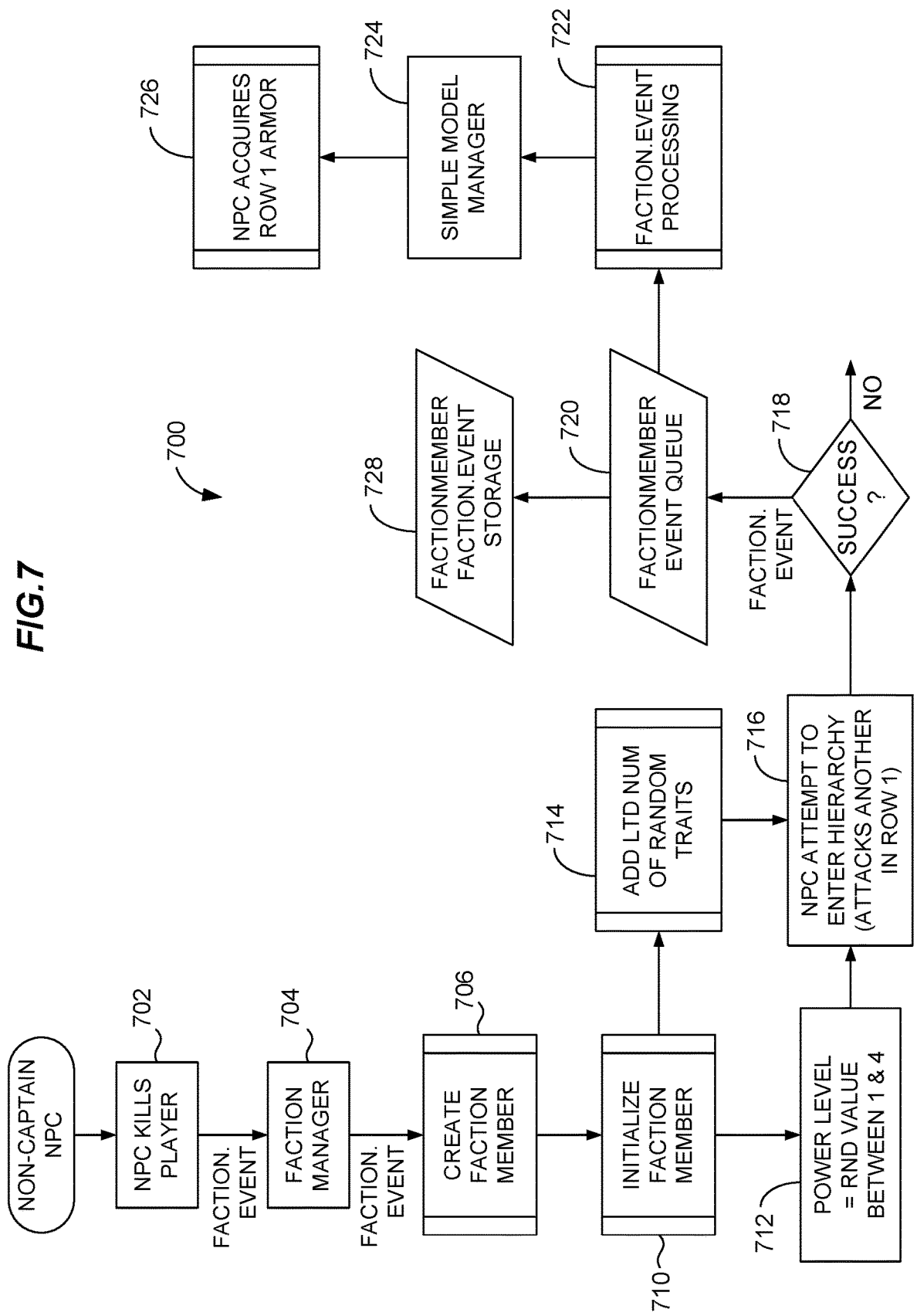

As another illustrative example of evolution of an NPC character, FIG. 7 shows a process flow 700 for the promotion of a non-captain NPC into the hierarchy of a faction. After the NPC enters the hierarchy, further evolution of the NPC may be handled via faction events records provided to a faction manager process, as explained in connection with FIG. 6. The process 700 may be initiated by a qualifying event, for example, a combat event 702 in which a player avatar is killed or beaten by the non-captain. A combat module may facilitate event processing, and once an outcome is determined, create a faction event record. A faction event record may be a digital record stored in a database or other data structure accessible to the game engine. A faction event record may indicate, for example, the type of event, a unique identifier for at least one NPC participating in the event, and an outcome of the event. Optionally, a faction event record may indicate or be associated with a faction identifier for the NPC, which may be maintained in a separate data table. In an alternative, there may be no faction identifier indicated or associated with the NPC.

At 702, a faction manager process may process the faction event record. A faction event process may be triggered periodically, or may be triggered by one or more events, as noted elsewhere herein. Based on the faction event record, available factions, the current state of one or more faction, and a set of rules governing promotion of non-faction members into a faction, the faction event process 702 may create a faction member record 706. The faction member record may be a digital record stored in a database or other data structure accessible to the game engine. The faction manager process 704 may initialize the faction member record, at 710. For example, the faction manager may initialize the member record by setting a power level to a value between a minimum level (e.g., 1) and a maximum value (e.g., 4). In addition, or in the alternative, the faction manager may select identifiers for one or more character traits, and append or associate the identifiers to the faction member record. Initialization of the faction member record may prepare the NPC for entry into a faction.

Once the faction member record is defined, the NPC that the record relates to may "attempt" to enter the hierarchy of the faction, at 716. This may be implemented by a combat module selecting an opponent for the NPC in the lowest rung of the hierarchy. In embodiments as shown herein, the lowest rung may be depicted as the lowest row in a rendering of the faction (see FIGS. 9-10). Opponent selection may be random, or according to some selection order or rule. Once the opponent is selected, the combat module may simulate a combat between the opponent and the NPC, based on their respective character parameters, using an algorithm that determines a combat outcome based on the parameters and, if desired, other random or predetermined factors based on the type of combat. If the NPC is not successful (loses the contest or is "killed"), it may be removed from the game or demoted to non-faction member status.

If the NPC is successful, the combat module may add a faction event record to a faction member event queue 720. The game engine may store 728 the queued faction event record in a memory accessible to the game engine, until an event that triggers processing of all queued faction event records occurs. Events for triggering faction event processing may include, for example, a player "death" event, player victory event involving a faction member, or the player moving into a new zone or level of play. Once triggered, faction event processing 722 is performed by the faction manager. In faction event processing, faction parameter and NPC parameters are updated according to the queued faction event records. For example, a model management module 724 may update appearance parameters for the NPC. A promoted NPC, for example, may be outfitted with a new set of armor 726 reflecting an increase in status. Computationally, an armor upgrade or other changes in appearance may be accomplished by associating the NPC identifier with a new set of computer graphics data defining a new "skin" for the NPC that includes the new armor. Various different data sets defining different NPC skins may be stored in game data, and/or modified during run time. Any suitable method for controlling the underlying graphics data used to generate a character may be used.

Figure 8:
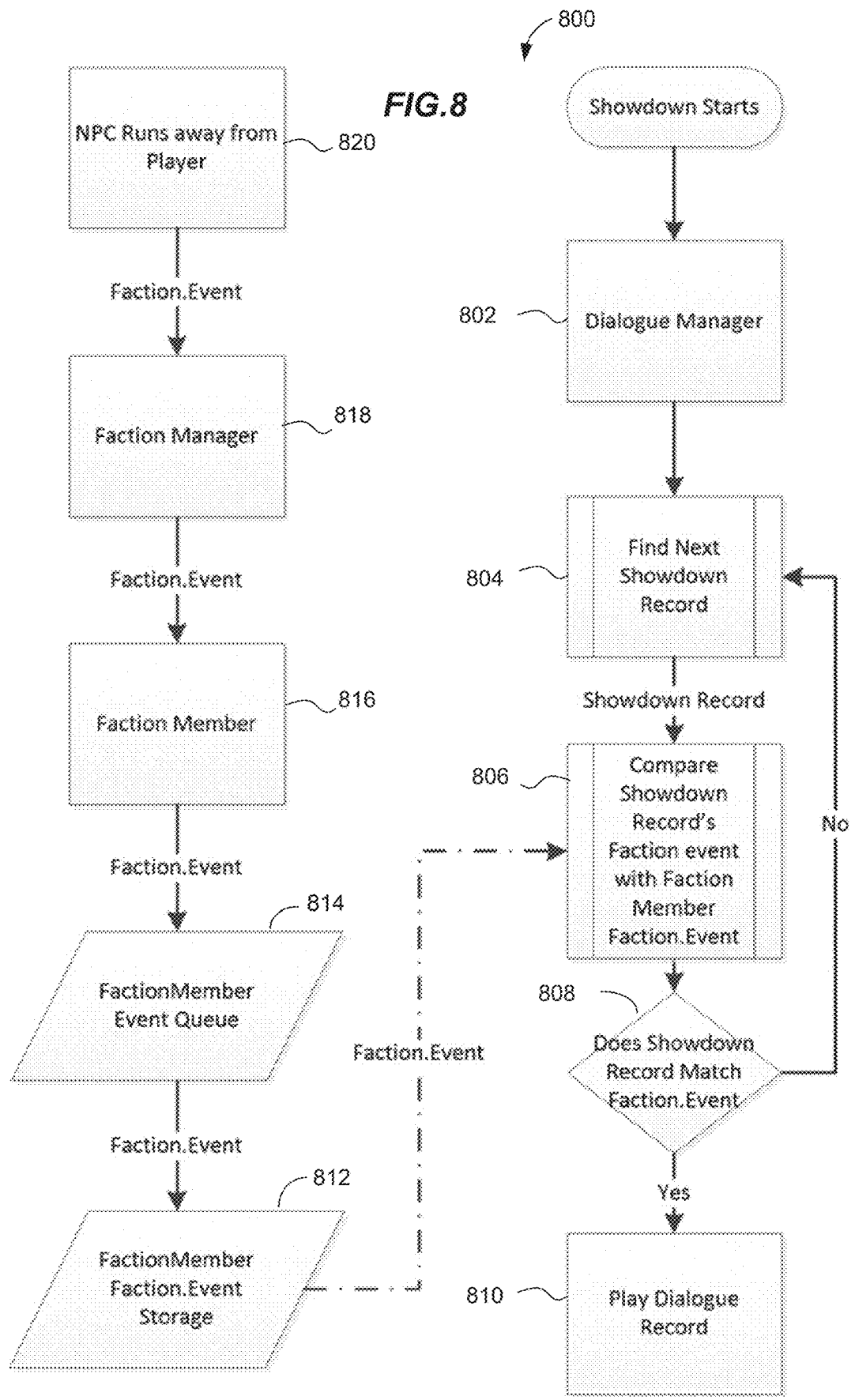
FIG. 8 is a flow chart illustrating aspects of a method for controlling NPC dialog based on past game events.

FIG. 8 is a flow chart illustrating aspects of a method 800 for controlling NPC dialog based on past game events. NPC dialogue can be triggered by previous encounters with the player avatar. For example, if the NPC had run away from the player avatar, the NPC dialog may include "My retreat was just strategy before! This time I'll end you!" If the NPC had killed the player avatar, the NPC dialog may include "Thought I killed you once already! Better make sure this time!" If the NPC was burnt and defeated by the player avatar, the NPC dialog may include "Thought I'd burned to a crisp? You're the one who's gonna burn!"

For further example, referring to FIG. 8 at 820, a combat module of the game engine may cause the NPC to run away from the player avatar. The "run away" event is merely for example, and other events may also be used to control future dialog. The encounter and event may be recorded by the game engine in a faction event record, as previously described. At 818, a faction manager module of the game engine may associate an NPC action record, "e.g., "ran away from player" with the applicable faction member 816 via the faction event record. In the alternative, or in addition, the faction manager may associate a dialog identifier with the event record, based on the NPC action. The modified faction event record may be placed in the faction member event queue 814 as previously described and stored 812 in a computer memory accessible to the game engine until needed for generating dialog.

Game data may include audio clips, each recording a different phrase or different voice for a phrase. Each audio clip may be identified by an identifier, called a showdown record. A "showdown" means an encounter between an NPC character and a player avatar that includes dialog by the NPC. If may occur prior to combat or other interaction with the player avatar, or may occur without preceding further interaction. Management of showdown records may be triggered by a dialogue manager 802 in response to detecting a showdown. Steps 804, 808 and 808 indicate steps of an if-then loop algorithm for locating a desired audio clip based on NPC action record or the dialog identifier recoded in the faction event storage 812 for the faction member involved in the showdown. An index of audio clips may be searched until a match is found, and the desired audio clip retrieved. Once played at 810, the NPC dialog will be the phrase selected by the faction manager 818 for the faction member 816 based on the prior event 820.

In addition to being controlled in response to past events, NPC dialogue may be triggered by recent player activity that is not necessarily due to a direct interaction. For example, if the player avatar killed a warchief's bodyguard, the warchief NPC's dialog may be "Curse you! My guard will be hard to replace!" If the player avatar issued a death threat against the NPC, the dialog may be "You promised to make me die screaming! Now I'll make you eat those words!" If the player avatar has been scoring many stealth kills, the NPC dialog may be "You're getting a reputation for sneaking about. Not very manly, is it?" A dialog control algorithm based on recent player activity may be similar to method 800, in which recent player activity replaces the prior NPC event 820.

In another aspect, the game engine may control NPC dialogue based on current context. For example, if both opponents are alone, the NPC dialog may be "So we fight alone . . . And you'll die alone!" If the player avatar interrupts a duel between NPCs, the dialog may be "Who told you we were here?! I'll kill you both!" If the player avatar is ambushed by an NPC that was hunting him, the dialog may be "I've been hunting you! Time to end your pathetic life!"

Figure 9A:
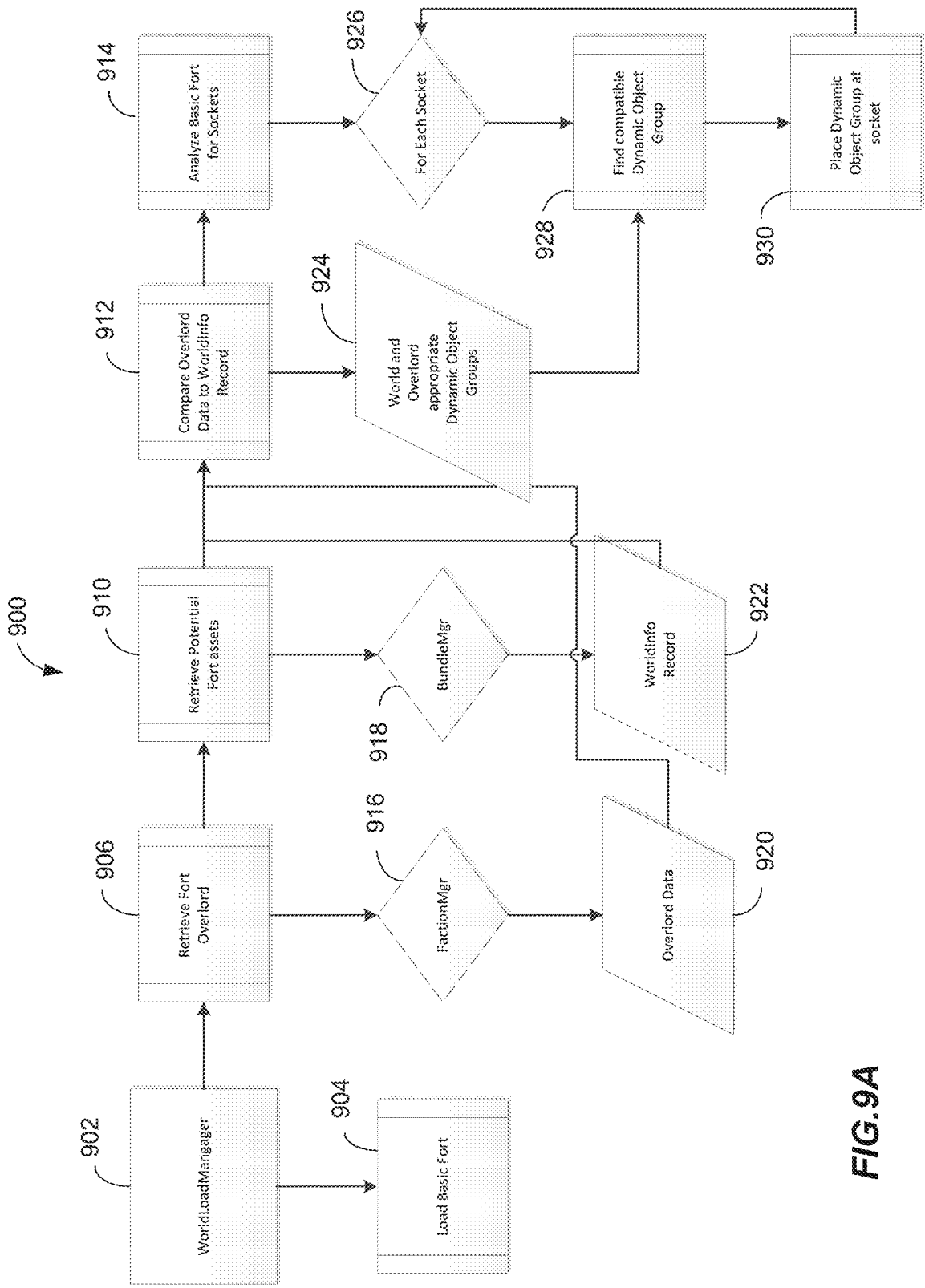
FIG. 9A is a flow chart illustrating aspects of a method for configuring a "fort" power center based on variable character parameters.

Referring to FIG. 9A, example processes and aspects of a method 900 for configuring a "fort" power center based on variable character parameters are illustrated. A fort is an example of a power center that is a stronghold occupied by NPCs either opposed or aligned to the player. Occupation of a fort may indicate and be conditioned on ownership of a swath of territory (a zone). A "nemesis fort" is a fort in which the structure of the fort is modified based on the NPCs assigned to the fort. In addition to purely visual and/or aural modification, an NPC's assignment to a fort may be used to trigger aspects of the gameplay associated with either the player (or AI combatants) assaulting the fort, including the addition of new types of fort defenses, or "fort traits."

Fort traits may be specific to an NPC's fort assignment. Just as an NPC may acquire new ability traits based on interaction with the player, they could also receive new fort traits or other power center traits. The power center traits are expressed by any power center game object that has a qualifying relationship to the NPC to which the trait is assigned in the game state data structure. For example, fort traits may be expressed by a fort object that is related to the NPC character to which the fort trait is assigned, through a specific relationship such as, for example, "owned by" or "in possession of." When rendering a fort or other power center, or configuring a game state data structure for the fort or other power center, the processor identifies the NPC or NPCs that have a qualifying relationship to the power center, retrieves any applicable power center traits of the qualifying NPCs, and assigns the trait to the fort or other power center. When the fort or other power center is then rendered or interacts with the game environment, the character traits are read by the processor and expressed according to the rules defined by the game engine.

The following description describes fort traits as an example, but it should be appreciated that similar traits may be applied to any power center in the game associated with a character. Fort traits may be used to augment the defenses of a fort, and will cause or influence game action when the fort is attacked. For example, fort traits may include "fire spouts," which will spew fire on enemy NPCs; "wall spikes," which prevent enemy NPCs from scaling fort walls, and "mines," which explode on contact by enemies. The fort traits may interact with other NPCs fighting on the side of an overlord to whom the fort trait belongs. For example, the game engine may cause warchiefs assigned to the fort to operate defenses defined by their overlord's fort traits. For instance, the fire spouts, while defined by the traits possessed by an overlord, may be caused to appear only if there is a warchief available to man them. This mode of game play opens up sophisticated modes for game play. For example, a player may manipulate the hierarchy through the Nemesis System, by killing the warchiefs assigned to the spouts, such that they will not appear when the user arrives at the fort.

Referring again to FIG. 9A, a game engine module "WorldLoadManager" 902 may manage the construction of a Nemesis fort. Initially, the module 902 loads a basic fort 904. A basic fort may be configured as a default or template for all forts in the game, and may lack any unique Nemesis Fort properties. The WorldLoadManager module 902 may interact via an intra-game interface with a FactionManager module 916, e.g., using a query/response or reading from a predetermined memory location) to discover an identity of an overload to which the fort belongs and any associated trait data 920. Next the module 902 may retrieve 910 all the Dynamic Object Groups (the aforementioned adornments or defenses) that have been created for this fort, via and via an intra-game interface with a Bundle Manager module 918. The module 902 may compare 912 the two resultant data sets, the overloard data 920 and the WorldInfoRecord 922 against each other to create a new data set 924. The new data set 924 includes only Dynamic Object Groups that were built for the fort being processed that are compatible with the overlord's tribe or fort traits.

Lastly, the WorldLoadManager 902 may analyze 914 the basic fort structure for sockets. Sockets are a point in space with identification properties that describe which Dynamic Object Groups are compatible with the socket. For instance, a socket may have a property that indicates it is a wall socket, meaning wall spikes or fire spout Dynamic Object Groups could be placed there. For each socket 926 the WorldLoadManager 902 finds (e.g., using a "do" loop), the module 902 may parse the data created in data set 924 until finding an appropriate Dynamic Object Group. The module 902 places 930 the found appropriate instance of one of the Dynamic Object Group at the socket position.

Referring to FIG. 9B, a method 950 for sharing faction parameters according to a social vendetta feature. Social vendettas refer to a programmed function of a game engine that enables a user to share out a portion of a user's unique hierarchy with other players. A Social vendetta may be created automatically by the application in response to a suitable event, for example, in response to a first user ($USER_1$) being defeated by an NPC. At any time prior to or upon initiation of a social vendetta, all unique attributes (visuals, traits, history) of the NPC's hierarchy are uploaded to a server for consumption by other users ($USERS_{2-n}$). When playing, any one or more of $USERS_{2-n}$ may encounter a vendetta mission start point retrieved from the game server. In response to any one of the $USERS_{2-n}$ activating the the start point, their game engine loads $USER_1$'s version of the world with $USER_1$'s unique hierarchy on the other player's (one of $USERS_{2-n}$) game instance. The $USERS_{2-n}$ game engine provides the objective of defeating the NPC that bested $USER_1$. This may be as simple as walking the avatar up to the NPC and beating it in combat, or it could involve all the previously mentioned aspects of the nemesis system and manipulating the NPC social structure (hierarchy) to achieve their objective.

The game engine may be configured so that social vendettas can be created manually by a user that cannot otherwise defeat an NPC, as might occur, for example because the NPC's power level and abilities exceed that of the user. In addition, the engine may enable the user to post a "bounty" in units of game credits or other game asset on the game server for other users to attempt to earn. Along with the bounty, the game engine may enable the user to contribute some amount of in-game resources as a reward. A user that successfully completes the bounty will earn the reward.

See diagram shown in FIG. 9B provides an example of how Social Vendettas may be shared between game instances operated by different users. The process 950 may start when a first "User1" 952 dies 958. In response, a Faction Manager module of the first user's game determines 960 whether the death is worth creating a Social Vendetta for the world. If so, the FactionManager 962 collects 966 the entire hierarchy for the current zone (not just the NPC that killed the player), and sends the faction data 968 to the Online Service Layer 964. The Online Service Layer sends the data to a remote server 954 for storage and distribution.

At some time in the future, a second user's "User 2" 956 Online Service Layer queries 970 the server to find any valid Social Vendettas 972. If one is found it will be presented to the user as an optional mission. If the user chooses to initiate the social vendetta 974, the faction data is pulled 976 from the server 954 and the current zone is repopulated 978 with the NPC's in User 1's faction.

Figure 10A:
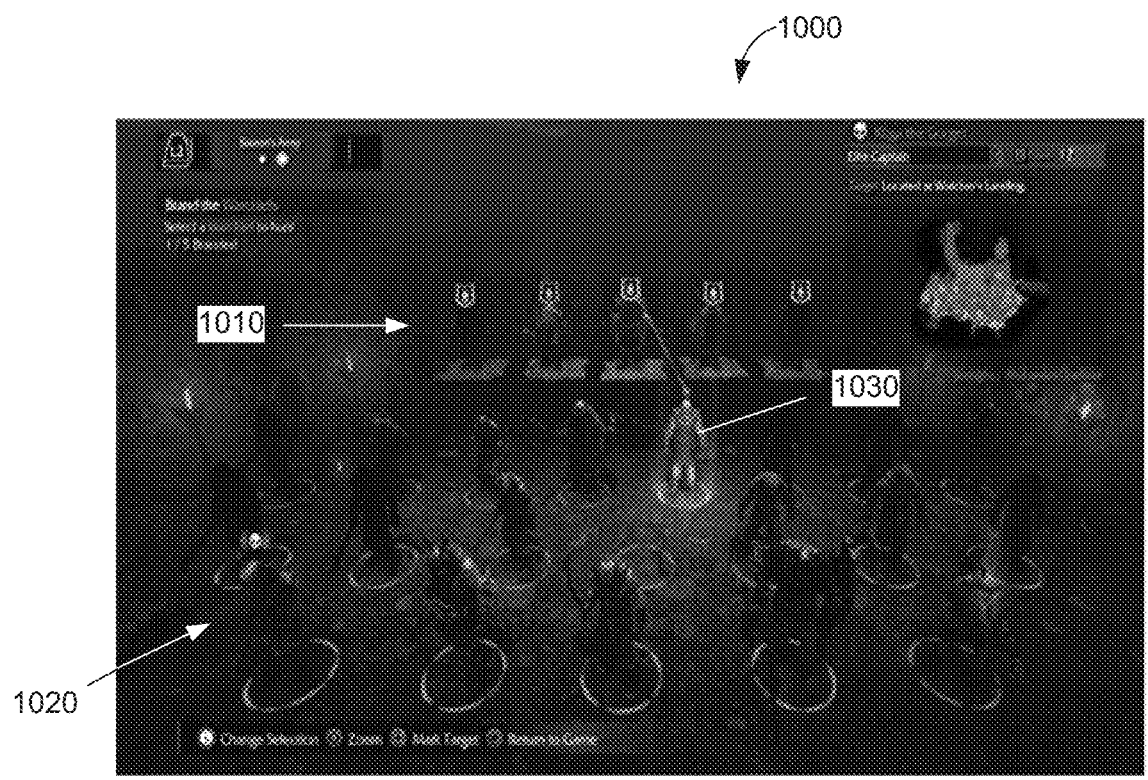
FIGS. 10A and 10B are screenshots illustrating displays of a faction of NPCs showing changes made in reaction to a game event.
Figure 10B:
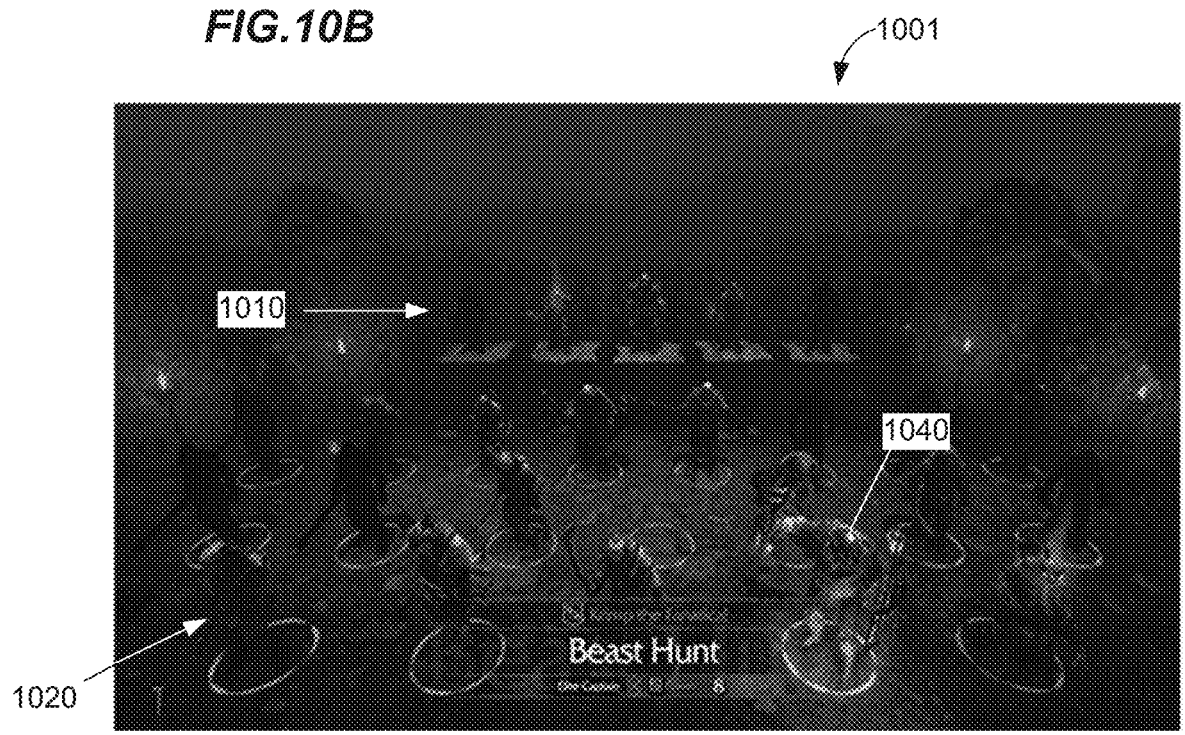

Factions are specific hierarchically organized sets of NPCs, which may be illustrated in a game display for entertainment of the player and enhancement of game play. Screenshots 900, 1000 illustrating displays of a faction of NPCs are shown in FIGS. 10A and 10B, respectively. The first screenshot 1000 shows a row of warchief NPCs 1010. In this display, the player has just selected one of the warchiefs 1010 to "hunt," and the display shows the player-selected warchief 1030 highlighted in the top row of the current faction membership display 1020. Screenshot 1001 shows a display after a game event in which a "Caragor" monster has been killed by the player avatar. A faction manager has determined that one of the NPCs 1040 in the faction was hunting the Caragor, and highlights the NPC 1040 to indicate that its power or traits have been improved in some way.

In view the foregoing, and by way of additional example, FIGS. 11-14 show aspects of a method or methods of game play for controlling evolution of a nemesis, as may be performed by a game engine described herein. Referring to FIG. 11, a computer-implemented method 1100 may include, at 1110, controlling, by a processor, game events in a computer-implemented game, the game events involving an avatar that is operated in response to input from a player, and a first non-player character that is controlled in response to a first set of character parameters defined in a computer memory and in response to operation of the avatar. As noted herein above, a non-player character (NPC) that evolves in reaction to game events may be called a "nemesis." The nemesis may recover from a defeat or even death to challenge the player later in the game, while evolving in response to prior game events involving the nemesis or a different non-player character that has a factional relationship (e.g., being a member of the same faction, or of a rival faction). These and other game effects may be provided by execution to the method 1100.

The method 1100 may further include, at 1120, detecting, by the processor, occurrence of a predefined game event involving the non-player character. Numerous different types of events may be defined, of which examples have been provided in the foregoing detailed description. The game event may involve the NPC directly, or indirectly. The NPC is directly involved if the event causes the game engine to change a game status of the NPC without referencing any relationship to an NPC that is only indirectly involved in the event. The NPC is indirectly involved if the event causes the game engine to change a parameter of the NPC based on a relationship to an NPC that is directly involved in the event. Events are interactions between characters managed by the game engine in response to user input, in which a current game state of one or more NPCs and/or the player avatar is changed. Detecting a predefined game event means that an event meeting predefined criteria is detected, for example, a specific type of game event. Examples of specific types of game events have been provided in the foregoing detailed description.

The method 1100 may further include, at 1130, changing, by the processor, a second set of character parameters defined in a computer memory for control of a second non-player character in the game based on the detecting. In addition, or in the alternative, the method 1100 may include changing the first set of character parameters, based on the detecting. Character parameters are distinguished from a current game state. Current game state refers to attributes such as position, orientation, velocity, actions, health state. Character parameters refers to an underlying set of values used to determine the characters skin, behavioral traits, powers, skills, and other personal attributes of the NPC.

In a related aspect, the method 1140 may include, at 1140, outputting, to an output device, an indication of the second set of character parameters (or if applicable, the first set of character parameters) that are changed by the changing operation. For example, the first or second non-player character may be given a different appearance, personality, behavior, or other characteristic that is evident to a player of the game through observing a display device and listening to audio output during game play. Numerous examples have been provided in the foregoing detailed description.

The method 1100 may include any one or more of additional operations 1200, 1300, 1400, 1500, or 1600 shown in FIG. 12, 13, 14, 15, or 16, in any operable order. Each of these additional operations is not necessarily performed in every embodiment of the method, and the presence of any one of the operations 1200, 1300, 1400, 1500, or 1600 does not necessarily require that any other of these additional operations also be performed.

Referring to FIG. 12, the method 1100 may further include, at 1210, triggering initiation of the changing operation 1130 based on a predefined trigger event. The trigger event may be any desired event, for example an event that relates to a narrative or dramatic fabric of the game. For example, a trigger event may be an avatar death, passage of a specified amount of time during game play, or entry of the avatar into a new zone of play. In an aspect, the changing may be preceded by creating a faction event record, which is queued and used to control the changes once the trigger event occurs. Examples of more detailed algorithms for changing an NPC parameter have been described above in connection with FIGS. 5-7. Unexpected aspects of the changing may include, for example, changing parameters of an NPC (i.e., the second NPC) that is not involved in the predefined game event detected at 1120. Thus, the player may experience that NPC's the player avatar has not confronted change and evolve in response to player actions involving other avatars in the faction.

In another aspect, the method 1100 may include, at 1220, selecting dialog for at least one of the first or second non-player character, based on the detecting the occurrence of the predefined game event. For example, the dialog may be selected to indicate a memory of or reaction to the game event, the next time the non-player character interacts with the player's avatar. Further details of dialog selection and control have been described herein above in connection with FIG. 8, among other places.

FIG. 13 shows additional operations or further aspects 1300 related to changing the NPC parameters. In an aspect, changing the second set of character parameters of operation 1130 may further include, at 1310, determining a change of status of the second non-player character in a faction of non-player characters, based at least in part on the one of the game events. As described above, game play may depend partly on status of non-player characters in the faction. As a non-player character moves up a hierarchy of the faction, for example, their game power may increase. Accordingly, in embodiments wherein, at 1320, the faction is a ranked hierarchy of the non-player characters in which rank is positively correlated with game playing power, changing the second set of character parameters may include changing a rank of the second non-player character in the hierarchy. FIG. 6 illustrates more detailed aspects of changing character parameters generally. Such parameters may include an NPC rank.

Changing the character parameters 1130 may include, at 1330, designating the second non-player character one of a ranked member of the hierarchy, or a non-member of the ranked hierarchy. FIG. 7 illustrates more detailed aspects of promoting an NPC into a faction.

In a related aspect, the method 1100 may include, at 1340, changing a status parameter of a third non-player character in the faction, based on the change of the status of one or both of the first and second non-player character. The status or other control parameters of multiple non-player characters may be changed based on a game event. Block 1340 described extending the changing of character parameters to additional NPCs. For each additional NPC, more detailed operations as described in FIGS. 6-7 may be used for changing character parameters.

Figure 14:
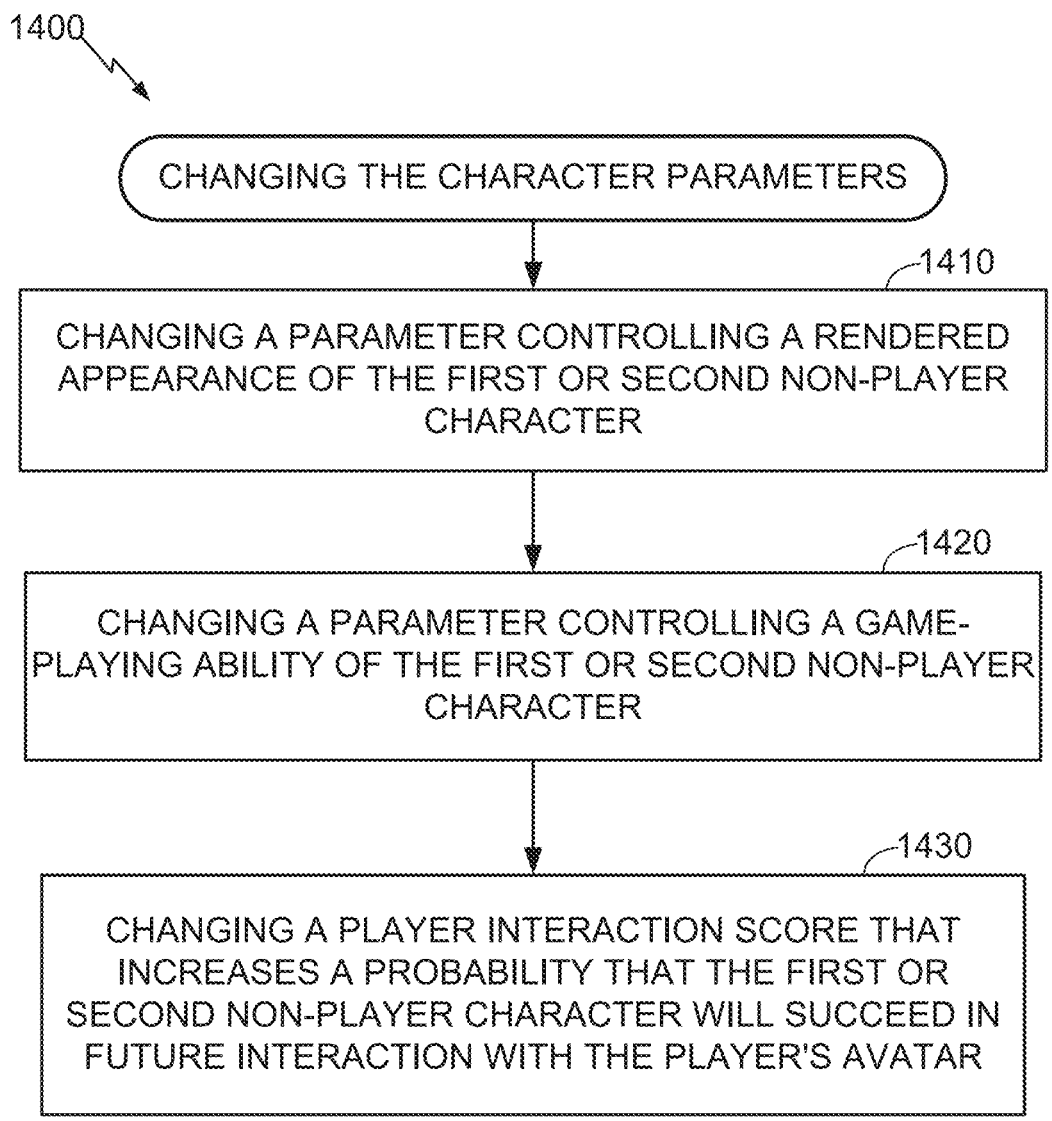

FIG. 14 shows some more additional operations or further aspects 1400 related to changing the NPC parameters. The character parameters may control various aspects of the non-player character's rendered appearance, behavior, power, or dialog. According, changing the parameters 1130 may include, at 1410, changing a parameter controlling a rendered appearance of the second non-player character. This may include, for example, rendering a character with added battle scars, upgraded armor, or new accessories. More detailed examples have been provided in the foregoing detailed description. Aspects of changing a characters appearance in response to events are also described in connection with FIG. 6.

In another aspect, changing the parameters 1130 may include, at 1420, controlling a game-playing ability of the second non-player character, or of the first non-player character, or both. Game playing ability may be related, by operation of the game engine, to a behavioral personality trait of the NPC. Numerous detailed examples of behavioral traits are provided in the detailed description about—including various kinds of strengths and weaknesses. These strengths and weaknesses may be influence the course and outcome of encounters between the player avatar and the NPC, or between NPCs, and hence, the NPCs' game playing abilities as experienced by the player.

In another aspect, changing the parameters 1130 may include, at 1440, changing a player interaction score that increases a probability that the second non-player character will succeed in future interaction with the player's avatar. Each of these changes may likewise be made to parameters controlling the first non-player character, or some other non-player character. An example of a player interaction score is a power level, as referenced at block 628 of FIG. 6 or block 712 of FIG. 7. The higher the power level, the greater the probability that the NPC will succeed in its interactions with player avatars or other NPCs, based on game engine rules. Other aspects of the method 110 may be as described in the detailed description above. Implementation of the method 1100 may increase use enjoyment of game play by causing the player's nemeses to evolve in complex ways in response to player actions and non-player events. Thus, game play is made less predictable and more interesting.

Figure 15:
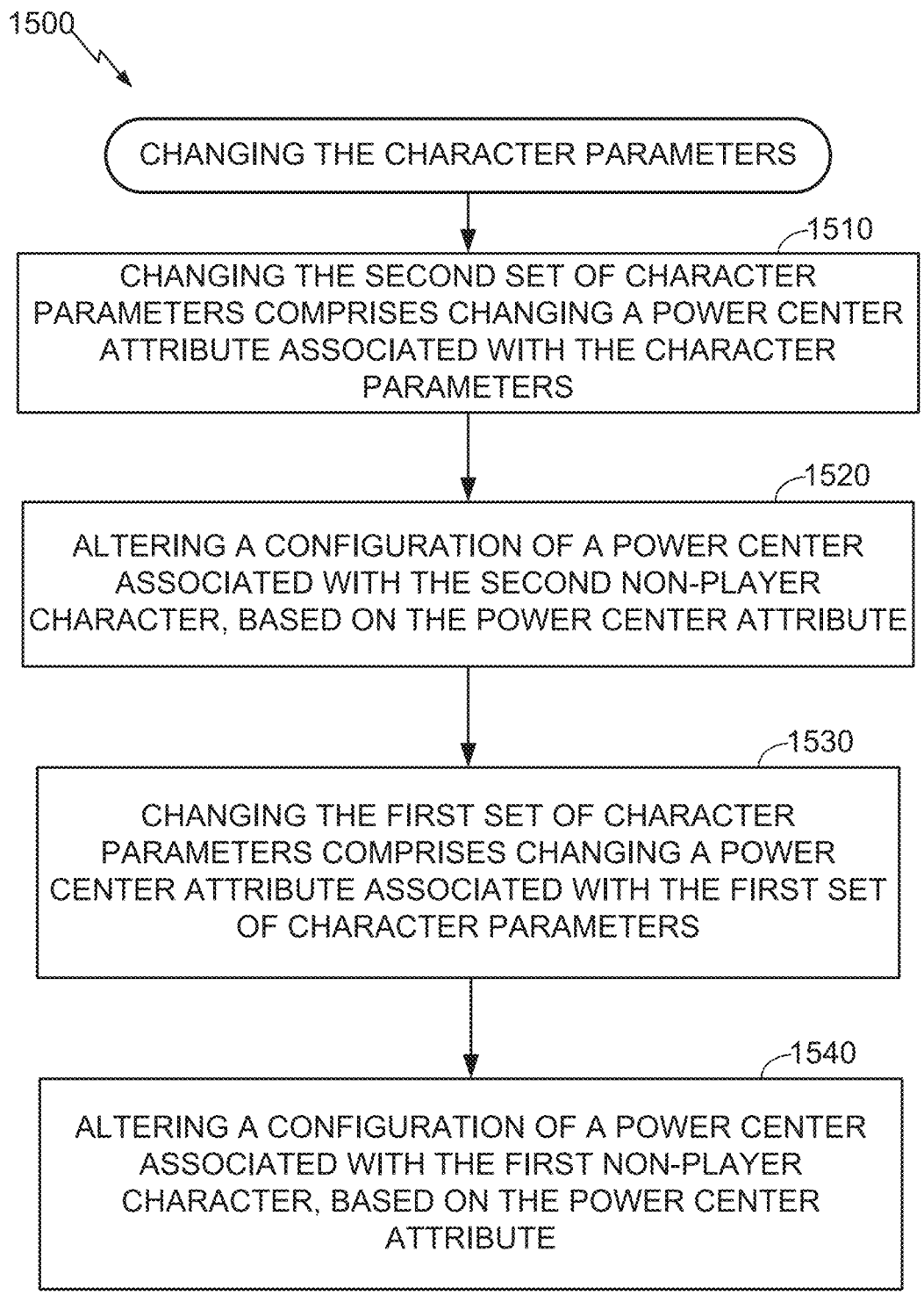

Referring to FIG. 15, examples of further operations 1500 pertaining to controlling character parameters for use with the method 1100 are illustrated. In an alternative, the processes 1500 may be performed independently of the method 1100, for example, in connection with a different computer game process. The method 1100 may further include, at 1510, changing, by a game engine, the second set of character parameters in a computer memory, including changing a power center attribute associated with the character parameters. The power center attribute may be configured to control the configuration or operation of the power center, which may be, for example, a stationary fort or moving vessel. The game engine as further described above may be implemented as a module or set of modules executed by one or more computer processors. Changing the power center attribute may include, for example, writing or modifying one or more bits of data structure (e.g., a data table), wherein the data structure determines one or more of the second set of character parameters, via a pointer or other predetermined relation established in a program structure. The data structure is identified in by program code so that the data within it can be called or read at time of execution of a module for configuring a power center.

The method 1100 may further include, at 1520, altering, by the game engine, a configuration of a power center associated with the second non-player character in a computer memory, based on the power center attribute. For example, if the player avatar enters a scene containing the power center, the power center module may read the character parameter from the data structure, and configure the power center based on the character parameter. For example, the power center module may add or replace 3D modeled features of the power center, modify a texture ("skin") applied to a 3D model of the power center, select a different 3D model for the entire power center, enable a different animation data set for depicting operation of power center features, and change one or more parameter values used for determining outcomes of game play events that involve the power center. Other, more specific examples have been provided herein above, with respect to a game fort.

As noted above, the power center attributes may be changed for second non-player character, based on an event involving the player and a different (e.g., the first) non-player character. In addition, the method 1100 may further include, at 1530, changing, by the game engine, a power center attribute associated with the first set of character parameters in a computer memory, in a manner similar to that described for the character parameters of the second non-player character. Likewise, the method 1100 may further include, at 1540, altering, by a game engine, a configuration of a power center associated with the first non-player character in a computer memory, based on the power center attribute. Again, the alteration may be performed by the game engine using a process similar to that described for the second non-player character above.

Figure 16:
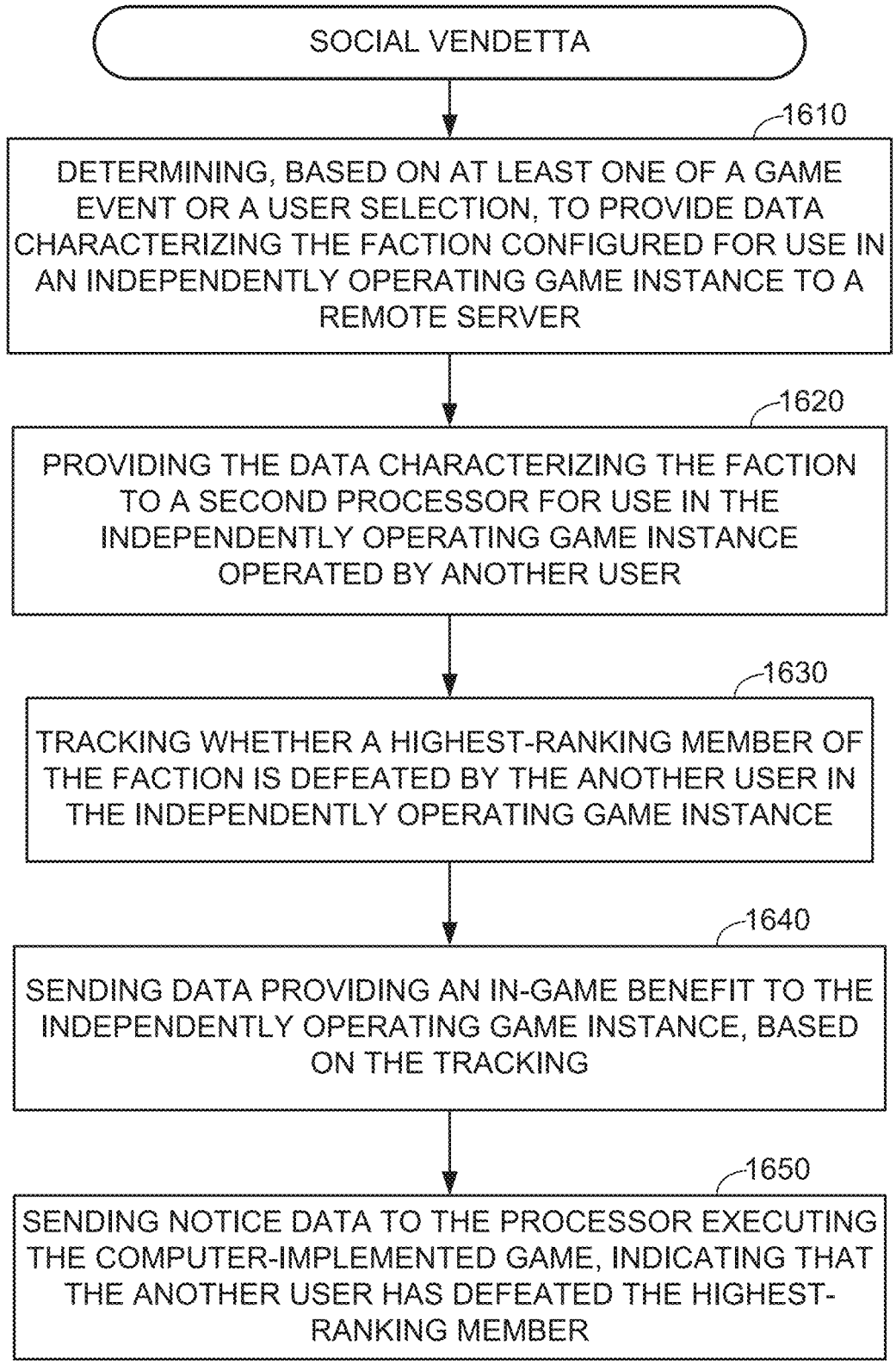

FIG. 16 illustrates aspects of computer processes 1600 for implementing a social vendetta feature as described herein above, in connection with the method 1100. In an alternative, the processes 1600 may be performed independently of the method 1100, for example, in connection with a different computer game process. The method 1100 may further include, at 1610 determining, by a first game engine executing in a first processor based on at least one of a game event or a user selection, to provide data characterizing the faction configured for use in an independently operating game instance to a remote server. The game engine as further described above may be implemented as a module or set of modules executed by one or more computer processors. The determining 1100 may include a computational process based on state data and user input for a computer game, and may result in output such as, for example, setting a bit or bits of data that characterizes the faction in a computer memory. Faction characteristics in the context of a game may include characteristics as described herein above, or similar characteristics.

The method 1100 may further include, at 1620, providing the data characterizing the faction from a first game instance of the first processor to a second processor for use in the independently operating game instance operated by another user using a second game engine. Providing the data characterizing the faction may include, for example, initiating, by a computer operating the game engine, a session with a server via one or more communication networks (e.g., the Internet, LAN, WLAN, etc.), and transmitting the data to the server with a direct or indirect indication that the data is for use in an independently operating game instance operated by another user. An example of a direct indication is setting a data bit or bits accompanying the transmitted game data, providing the indication. An example of an indirect indication is transmitting the game data in a session context causing the purpose for the transmitted data to be recognized by the receiving computer, by implication of the context. The second game engine may then similarly obtain the data from the server, for example in response to user selection input provided in response to a menu served by the server. In an alternative to providing the data to the server, the first processor may establish a peer-to-peer session directly with a second processor operating the second game instance, and provide the data direct to the peer processor. Once receiving the faction data, the second game engine may reproduce the faction in the second game instance, enabling the second user to play against the second faction.

The method 1100 may further include, at 1630, tracking, by at least one of the server, the second game engine, or the first game engine, whether a highest-ranking member of the faction is defeated by the other user in the independently operating game instance. The second game engine may, for example, send data to the server or directly to the first game engine indicating a status or outcome of game play on the second game engine.

The method 1100 may further include, at 1630, sending, by at least one of the server or the first game engine, data providing an in-game benefit to the independently operating game instance, based on the tracking. For example, the server may provide in-game credits or objects to the second game engine for successfully defeating the faction. In an aspect, the first game engine may "pay" for the credits supplied to the second game, for example by depleting credits or removing objects from the first game instance. In another aspect, the method 1100 may further include, at 1640, sending notice data to the processor executing the first computer-implemented game, indicating that the another user has defeated the highest-ranking member. In response, the first game engine may progress the game on the first machine as if the faction had been defeated there. Thus, the first user can benefit from the gaming skill of the second user, if desired.

Figure 17:
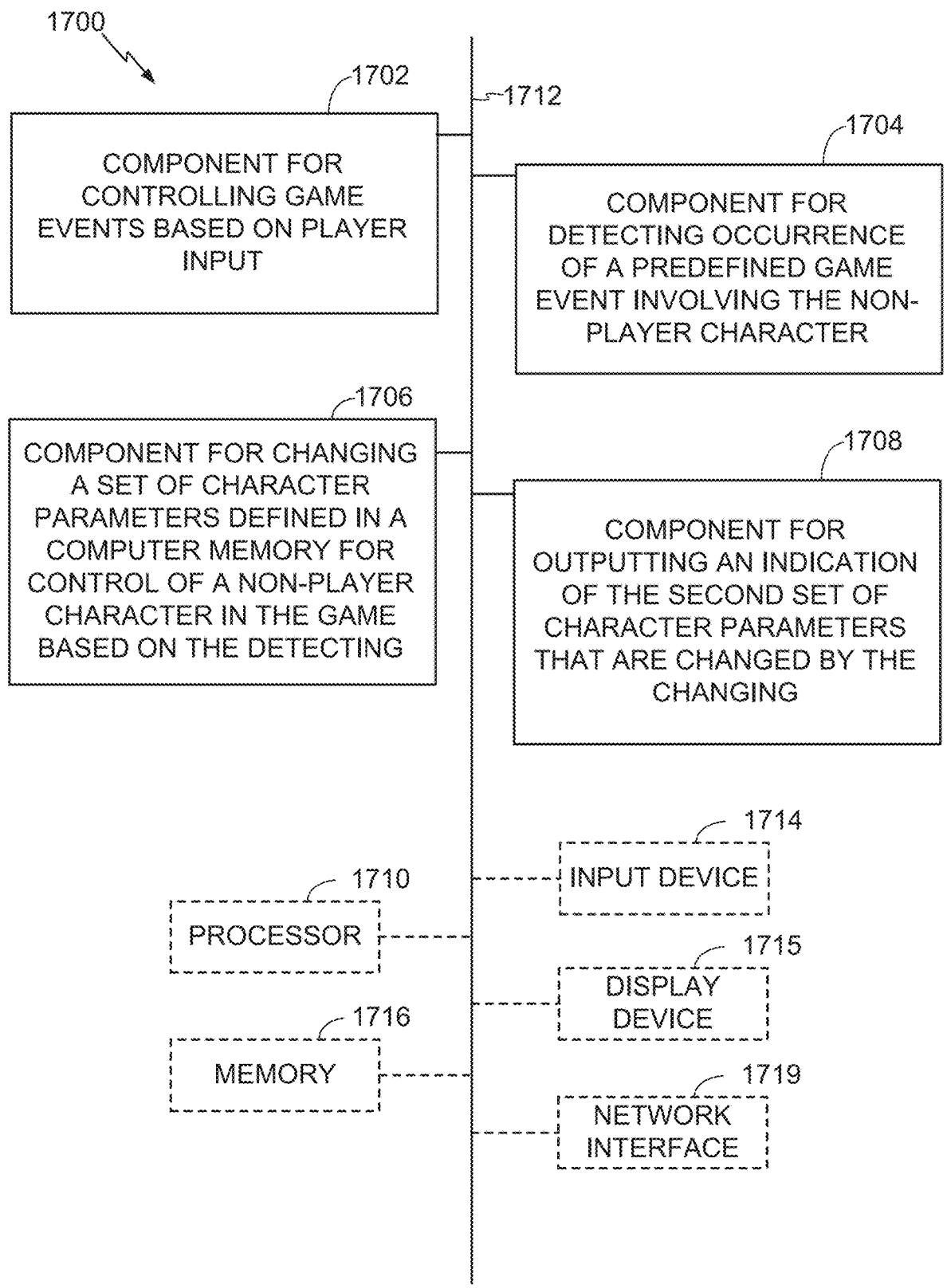
FIG. 17 is a conceptual block diagram illustrating components of an apparatus or system for controlling evolution of a nemesis.

FIG. 17 is a conceptual block diagram illustrating components of an apparatus or system 1700 for controlling evolution of a nemesis. The apparatus or system 1700 may include additional or more detailed components as described herein. For example, the processor 1710 and memory 1716 may contain an instantiation of a game engine as described herein above, including the more detailed components pointed out in FIG. 17 and other ancillary components. As depicted, the apparatus or system 1700 may include functional blocks that can represent functions implemented by a processor, software, or combination thereof (e.g., firmware).

As illustrated in FIG. 17, the apparatus or system 1700 may comprise an electrical component 1702 for controlling game events based on player input. The component 1702 may be, or may include, a means for controlling game events based on player input. Said means may include the processor 1710 coupled to the memory 1716, and to the input device 1714, the processor executing an algorithm based on program instructions stored in the memory. Such algorithm may include a sequence of more detailed operations, for example, receiving input signals from the input device 1714, processing the signals including relating ones of the signals to a game process, and determining game events at least in part based on the processed ones of the input signals.

The apparatus 1700 may further include an electrical component 1704 for detecting occurrence of a predefined game event involving the non-player character. The component 1704 may be, or may include, a means for detecting occurrence of a predefined game event involving the non-player character. Said means may include the processor 1710 coupled to the memory 1716, and to the input device 1714, the processor executing an algorithm based on program instructions stored in the memory. Such algorithm may include a sequence of more detailed operations, for example, determining a result of a game operation involving a non-player character, changing a state recorded for the non-player character based on the result, and comparing an indicator of the change in state, or the result, to a data table of game events indicated by indicators to discover a match.

The apparatus 1700 may further include an electrical component 1706 for changing a set of character parameters defined in a computer memory for control of a non-player character, based on the detecting. The non-player character may be the character involved in the detected event, or a different non-player character not involved in the event. The component 1706 may include a means for changing a set of character parameters defined in a computer memory for control of a non-player character, based on the detecting. Said means may include the processor 1710 coupled to the memory 1716, the processor executing an algorithm based on program instructions stored in the memory. Such algorithm may include a sequence of more detailed operations, for example, reading indicators of a game result, looking up a data table of potential character parameter changes or executing a random number generator, selecting one or more of the potential character parameter changes based on the indicators of the event result, creating a record of the selected changes and/or of a random value generated by the random number generator, and placing the record in a queue. Further examples of more detailed algorithms are provided in connection with FIGS. 5-7 and 12-14 above.

The apparatus 1700 may further include an electrical component 1708 for outputting an indication of the set of character parameters that are changed by the changing. The component 1708 may include a means for outputting an indication of the set of character parameters that are changed by the changing. Said means may include the processor 1710 coupled to the memory 1716, and to the display device 1715, the processor executing an algorithm based on program instructions stored in the memory. Such algorithm may include a sequence of more detailed operations, for example, controlling game events involving the NPC based on the changed parameters, rendering the game events, and providing rendered output to the display device.

The apparatus 1700 may optionally include a processor module 1710 having at least one processor, in the case of the apparatus 1700 configured as a data processor. The processor 1710, in such case, may be in operative communication with the modules 1702-1706 via a bus 1712 or similar communication coupling. The processor 1710 may effect initiation and scheduling of the processes or functions performed by electrical components 1702-1706.

In related aspects, the apparatus 1700 may include a network interface module 1719 operable for communicating with a game server over a computer network. In further related aspects, the apparatus 1700 may optionally include a module for storing information, such as, for example, a memory device/module 1716. The computer readable medium or the memory module 1716 may be operatively coupled to the other components of the apparatus 1700 via the bus 1712 or the like. The memory module 1716 may be adapted to store computer readable instructions and data for effecting the processes and behavior of the modules 1702-1706, and subcomponents thereof, or the processor 1710, or the method 1100 and one or more of the additional operations 1200, 1300, 1400, 1500, or 1600 disclosed herein. The memory module 1716 may retain instructions for executing functions associated with the modules 1702-1706. While shown as being external to the memory 1716, it is to be understood that the modules 1702-1706 can exist within the memory 1716.

The apparatus 1700 may include a display device 1715, which may include one or more display outputs (e.g., LCD display screens or DLP projectors) coupled to the processor 1710 via a bus 1712 and a graphics processing unit (not shown). Other outputs may include, for example, an audio output transducer (not shown). The input device 1714 may comprise any suitable device for obtaining player input, examples of which are provided herein above.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Of course, those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The invention claimed is:

1. A method comprising:
controlling, by a processor, game events in a computer-implemented game, the game events involving an avatar that is operated in response to input from a player, and a first non-player character that is controlled by the processor to respond to and automatically oppose avatars based on first character parameters defined in a computer memory;
detecting, by the processor, occurrence of a predefined one of the game events involving an interaction between the avatar and the first non-player character;
changing, by the processor, second character parameters defined in at least one of the computer memory or a second computer memory for control of a second non-player character in the game based on the detecting, wherein the second non-player character is controlled by the processor to respond to and automatically oppose avatars based on the second character parameters defined in the at least one of the computer memory or the second computer memory; and
outputting, to an output device, an indication of the second character parameters that are changed by the changing.

2. The method of claim 1, further comprising triggering initiation of the changing based on occurrence of the predefined one of the game events selected from the group consisting of the avatar death or entry of the avatar into a new zone of play.

3. The method of claim 1, wherein the changing the second character parameters further comprises determining a change of status of the second non-player character in a faction of non-player characters, based at least in part on the one of the game events.

4. The method of claim 3, wherein the faction is a ranked hierarchy of the non-player characters in which ranks are positively correlated with game playing power, and changing the second character parameters comprises at least one of: changing a rank of the second non-player character in the hierarchy, or designating the second non-player character one of a ranked member of the hierarchy, or a non-member of the ranked hierarchy.

5. The method of claim 4, further comprising determining, based on at least one of a game event or a user selection, to provide data characterizing the faction configured for use in an independently operating game instance to a remote server.

6. The method of claim 5, further comprising providing the data characterizing the faction to a second processor for use in the independently operating game instance operated by another user.

7. The method of claim 6, further comprising tracking whether a highest-ranking member of the faction is defeated by the another user in the independently operating game instance.

8. The method of claim 7, further comprising sending data providing an in-game benefit to the independently operating game instance, based on the tracking.

9. The method of claim 7, further comprising sending notice data to the processor executing the computer-implemented game, indicating that the another user has defeated the highest-ranking member.

10. The method of claim 3, further comprising changing a status parameter of a third non-player character in the faction, based on the change of the status of one or both of the first and second non-player character.

11. The method of claim 1, wherein the changing the second character parameters comprises at least one of: changing a parameter controlling a rendered appearance of the second non-player character, changing a parameter controlling a behavioral personality trait of the second non-player character, changing a parameter controlling a game-playing ability of the second non-player character, changing a player interaction score that increases a probability that the second non-player character will succeed in future interaction with the player's avatar, or changing a power center attribute associated with the second character parameters.

12. The method of claim 11, further comprising altering a configuration of a power center associated with the second non-player character, based on the power center attribute.

13. The method of claim 1, further comprising selecting dialog for at least one of the first or second non-player character, based on the detecting the occurrence of the predefined one of the game events.

14. The method of claim 1, further comprising changing, by the processor, the first character parameters based on the detecting; and
outputting, to at least one of the output device or to a second output device, an indication of the first character parameters that are changed by the changing the first character parameters.

15. The method of claim 14, wherein the changing the first character parameters further comprises determining a change of status of the first non-player character in a faction of non-player characters, based at least in part on the one of the game events.

16. The method of claim 15, wherein the faction is a ranked hierarchy of the non-player characters in which ranks are positively correlated with game playing power, and changing the first character parameters comprises at least one of: changing a rank of the first non-player character in the hierarchy, or designating the first non-player character one of a ranked member of the hierarchy, or a non-member of the ranked hierarchy.

17. The method of claim 14, wherein the changing the first character parameters comprises changing a parameter controlling at least one of: a rendered appearance of the first non-player character, a behavioral personality trait of the first non-player character, a game-playing ability of the first non-player character, a player interaction score that increases a probability that the first non-player character will succeed in future interaction with the player's avatar, or a power center attribute associated with the first character parameters.

18. The method of claim 17, further comprising altering a configuration of a power center associated with the first non-player character, based on the power center attribute.

19. An apparatus for controlling a video game, comprising:
a processor, a memory coupled to the processor, and a display device coupled to the processor, wherein the memory holds instructions that when executed by the processor, cause the apparatus perform:
controlling game events in a computer-implemented game, the game events involving an avatar that is operated in response to input from a player, and a first non-player character that is controlled by the processor to respond to and automatically oppose avatars based on a first character parameters defined in a computer memory;
detecting occurrence of a predefined one of the game events involving an interaction between the avatar and the first non-player character;
changing second character parameters defined in at least one of the computer memory or a second computer memory for control of a second non-player character in the game based on the detecting, wherein the second non-player character is controlled by the processor to respond to and automatically oppose avatars based on the second character parameters defined in the at least one of the computer memory or the second computer memory; and
outputting, to an output device, an indication of the second character parameters that are changed by the changing.

20. The apparatus of claim 19, wherein the memory holds further instructions for triggering initiation of the changing based on occurrence of the predefined one of the game events selected from the group consisting of the avatar death or entry of the avatar into a new zone of play.

21. The apparatus of claim 19, wherein the memory holds further instructions for the changing the second character parameters at least in part by determining a change of status of the second non-player character in a faction of non-player characters, based at least in part on the one of the game events.

22. The apparatus of claim 21, wherein the memory holds further instructions for maintaining the faction as a ranked hierarchy of the non-player characters in which ranks are positively correlated with game playing power, and changing the second character parameters comprises at least one of: changing a rank of the second non-player character in the hierarchy, or designating the second non-player character one of a ranked member of the hierarchy, or a non-member of the ranked hierarchy.

23. The apparatus of claim 21, wherein the memory holds further instructions for changing a status parameter of a third non-player character in the faction, based on the change of the status of one or both of the first and second non-player character.

24. The apparatus of claim 21, wherein the memory holds further instructions for determining, based on at least one of a game event or a user selection, to provide data characterizing the faction configured for use in an independently operating game instance to a remote server.

25. The apparatus of claim 24, wherein the memory holds further instructions for providing the data characterizing the faction to a second processor for use in the independently operating game instance operated by another user.

26. The apparatus of claim 25, wherein the memory holds further instructions for tracking whether a highest-ranking member of the faction is defeated by the another user in the independently operating game instance.

27. The apparatus of claim 26, wherein the memory holds further instructions for sending data providing an in-game benefit to the independently operating game instance, based on the tracking.

28. The apparatus of claim 27, wherein the memory holds further instructions for sending notice data to the processor executing the computer-implemented game, indicating that the another user has defeated the highest-ranking member.

29. The apparatus of claim 19, wherein the memory holds further instructions for the changing the second character parameters at least in part by one or more of: changing a parameter controlling a rendered appearance of the second non-player character, changing a parameter controlling a behavioral personality trait of the second non-player character, changing a parameter controlling a game-playing ability of the second non-player character, changing a player interaction score that increases a probability that the second non-player character will succeed in future interaction with the player's avatar, or changing a power center attribute associated with the second character parameters.

30. The apparatus of claim 29, wherein the memory holds further instructions for altering a configuration of a power center associated with the second non-player character, based on the power center attribute.

31. The apparatus of claim 19, wherein the memory holds further instructions for selecting dialog for at least one of the first or second non-player character, based on the detecting the occurrence of the predefined one of the game events.

32. The apparatus of claim 19, wherein the memory holds further instructions for changing the first sct of character parameters defined in a computer memory based on the detecting; and
    outputting, to at least one of the output device or a second output device, an indication of the first character parameters that are changed by the changing the first character parameters.

33. The apparatus of claim 32, wherein the memory holds further instructions for the changing the first character parameters at least in part by determining a change of status of the first non-player character in a faction of non-player characters, based at least in part on the one of the game events.

34. The apparatus of claim 33, wherein the memory holds further instructions for maintaining the faction as a ranked hierarchy of the non-player characters in which ranks are positively correlated with game playing power, and changing the first character parameters comprises at least one of: changing a rank of the first non-player character in the hierarchy, or designating the first non-player character one of a ranked member of the hierarchy, or a non-member of the ranked hierarchy.

35. The apparatus of claim 33, wherein the memory holds further instructions for changing the first character parameters at least in part by changing a parameter controlling at least one of: a rendered appearance of the first non-player character, a behavioral personality trait of the first non-player character, a game-playing ability of the first non-player character, a player interaction score that increases a probability that the first non-player character will succeed in future interaction with the player's avatar, or a power center attribute associated with the first character parameters.

36. A video game apparatus, comprising:
    means for controlling game events in a computer-implemented game, the game events involving an avatar that is operated in response to input from a player, and a first non-player character that is controlled by the processor to respond to and automatically oppose avatars based on first character parameters defined in a computer memory;
    means for detecting occurrence of a predefined one of the game events involving an interaction between the avatar and the first non-player character;
    means for changing second character parameters defined in at least one of the computer memory or a second computer memory for control of a second non-player character in the game based on the detecting, wherein the second non-player character is controlled by the processor to respond to avatars and automatically oppose based on the second character parameters defined in the at least one of the computer memory or the second computer memory; and
    means for outputting, to an output device, an indication of the second character parameters that are changed by the changing.

\* \* \* \* \*